(12) United States Patent
Ichikawa

(10) Patent No.: US 8,003,987 B2
(45) Date of Patent: Aug. 23, 2011

(54) REFLECTION TYPE LIQUID CRYSTAL DISPLAY APPARATUS AND LIQUID CRYSTAL PROJECTOR SYSTEM

(75) Inventor: Takeshi Ichikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/540,486

(22) Filed: Aug. 13, 2009

(65) Prior Publication Data
US 2009/0303425 A1    Dec. 10, 2009

Related U.S. Application Data

(62) Division of application No. 11/736,139, filed on Apr. 17, 2007, now Pat. No. 7,671,365.

(30) Foreign Application Priority Data

Apr. 18, 2006 (JP) .................... 2006-114432
Apr. 18, 2006 (JP) .................... 2006-114433
Apr. 16, 2007 (JP) .................... 2007-106671

(51) Int. Cl.
    H01L 29/23 (2006.01)
(52) U.S. Cl. .............. 257/59; 257/72; 438/38
(58) Field of Classification Search ........... 257/59, 257/72; 349/38, 114
    See application file for complete search history.

(56) References Cited

U.S. PATENT DOCUMENTS

| | | | |
|---|---|---|---|
| 5,176,557 A | 1/1993 | Okunuki et al. | 445/24 |
| 5,706,067 A | 1/1998 | Colgan et al. | 349/114 |
| 6,057,897 A | 5/2000 | Ichikawa et al. | 349/48 |
| 6,078,368 A | 6/2000 | Ichikawa et al. | 349/48 |
| 6,127,998 A | 10/2000 | Ichikawa et al. | 345/100 |
| 6,163,352 A | 12/2000 | Ichikawa et al. | 349/106 |
| 6,166,792 A | 12/2000 | Miyawaki et al. | 349/113 |
| 6,339,459 B1 * | 1/2002 | Ichikawa et al. | 349/95 |
| 6,480,170 B1 * | 11/2002 | Langley et al. | 343/826 |
| 6,480,179 B1 | 11/2002 | Akimoto | 345/92 |
| 6,507,376 B2 | 1/2003 | Nakamura | 349/38 |
| 6,512,566 B1 | 1/2003 | Yamagishi et al. | 349/139 |
| 6,559,821 B2 | 5/2003 | Ichikawa et al. | 345/92 |
| 6,710,403 B2 | 3/2004 | Sapp | 257/330 |
| 6,762,738 B2 | 7/2004 | Frazee et al. | 345/90 |
| 6,909,532 B2 | 6/2005 | Chung et al. | 359/296 |
| 7,671,365 B2 * | 3/2010 | Ichikawa | 257/59 |

FOREIGN PATENT DOCUMENTS

JP        8-146458       6/1996

* cited by examiner

Primary Examiner — Howard Weiss
Assistant Examiner — Steven H Rao
(74) Attorney, Agent, or Firm — Fitzpatrick, Cella, Harper & Scinto

(57) ABSTRACT

In order to suppress the effect due to electrons (holes) generated by incident light that cannot be prevented from entering only by means of light shielding, rather than the drain region 34 of a transistor, with respect to a majority carrier, a region 36 whose voltage is set to a value lower than the reference value of product of the voltage of a drain region and Q (unit electric charge) is provided, or a potential barrier is provided around the drain region. In such a configuration, by controlling the voltage of the periphery of the drain region 34 connected to a reflection electrode 30 to be in a floating state, photo carriers generated in the semiconductor substrate are caused to be hardly guided in the drain region 34.

16 Claims, 18 Drawing Sheets

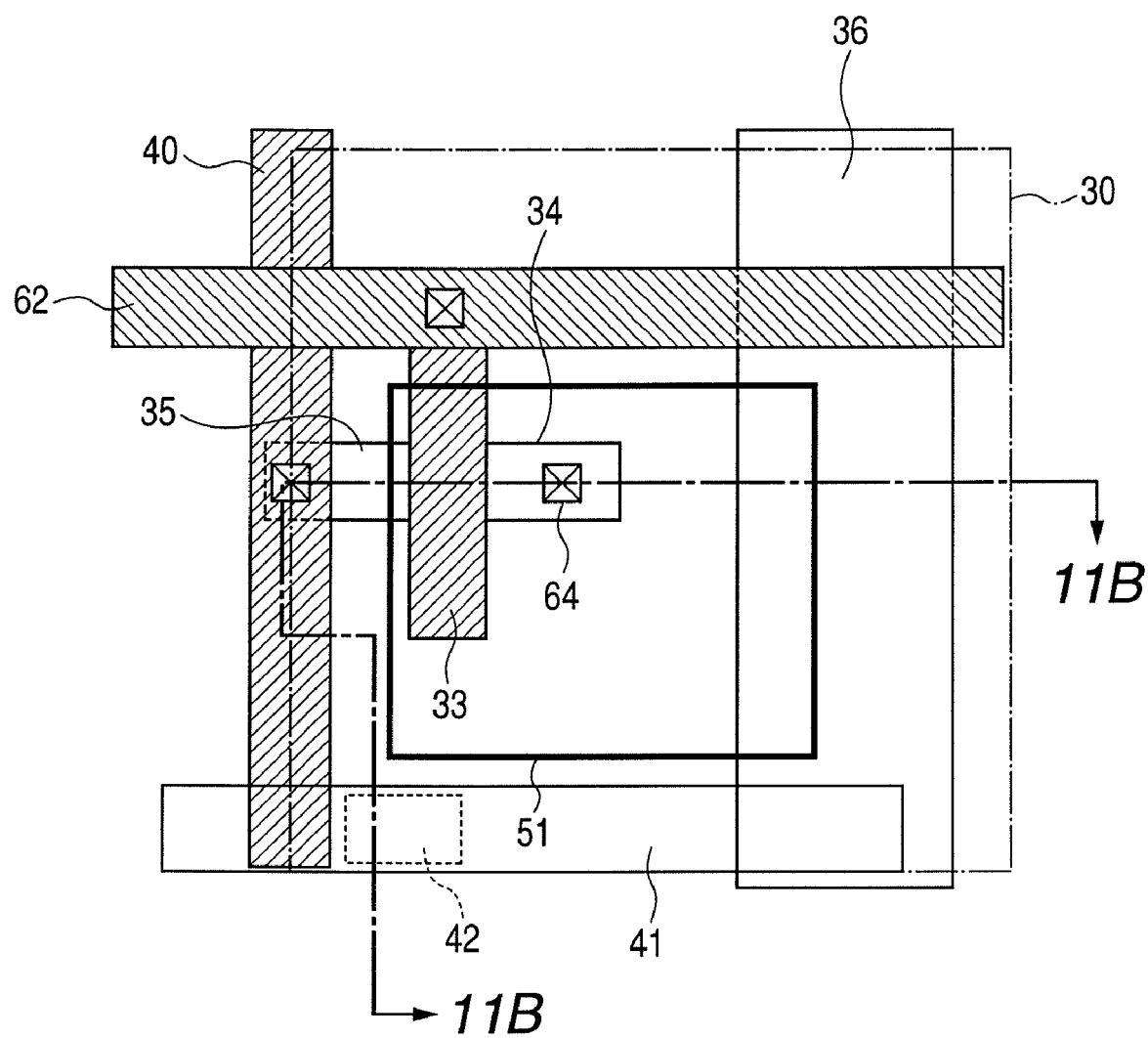

REFLECTION TYPE LIQUID CRYSTAL DISPLAY APPARATUS AND LIQUID CRYSTAL PROJECTOR SYSTEM

BACKGROUND OF THE INVENTION

1. Field of the Invention

The present invention relates to a reflection type liquid crystal display apparatus and a liquid crystal projector system.

2. Description of the Related Art

Nowadays, an age of multimedia has begun, and equipment communicating by using image information has been more and more important. Among others, since being thin and having small power consumption, a liquid display apparatus have been paid attention, and have grown up to a key industry comparable to the semiconductor industry.

As for the liquid crystal display apparatus, today, as the screen size becomes larger, not only the price of a manufacturing apparatus becomes higher but also rigorous electrical properties are required for driving the large screen. Therefore, a projection type liquid crystal display apparatus where a small size liquid crystal display panel is prepared, and an image is optically enlarged and displayed, has been paid attention. This is because, similar to a scaling law where, as the size of a semiconductor becomes smaller, the performance and the price of the semiconductor, become better, it is possible not only to improve the properties of the liquid crystal display apparatus by causing the size to be smaller, but also to reduce the cost of the liquid crystal display apparatus. However, since an image is enlarged by irradiating a light on a small size liquid crystal display panel, the influence of the light to a semiconductor circuit can not be ignored. Therefore, for example, in U.S. Pat. No. 5,706,067, a liquid crystal display apparatus is disclosed, where, by using a light shielding layer such as a lamination film of Ti and TiN, light incidence into a semiconductor circuit is protected.

However, in the projection type liquid crystal display apparatus, brighter displaying is required, thereby the liquid crystal display apparatus is irradiated with a more intense light. Therefore, it is difficult to entirely protect a light from entering in the semiconductor circuit by merely using the light shielding layer, rather a part of the light enters the semiconductor circuit, thereby photo carriers may be generated in the semiconductor circuit. Once the generated photo carriers reach to a switching element of the semiconductor circuit, there is a possibility that an adverse affect is given to the operation of the switch element, thereby, normal displaying operation cannot be performed. Such an adverse affect with respect to the switch element due to the photo carriers, is referred to as light leakage.

Therefore, in Japanese Patent Application Laid-Open No. H08-146458, it is disclosed to provide an n-type semiconductor region which is the same type as the type of a drain region of a switching element provided to a p-type Si substrate, and has an area larger than the area of the drain region, to the surroundings of the drain region. Furthermore, by fixing the potential of the p-type Si substrate to the ground potential using a ground electrode, a positive bias is applied to the n-type semiconductor region. By this procedure, positive holes and electrons of the photo carriers generated in the p-type Si substrate are absorbed in the ground electrode and the n-type semiconductor region, respectively. Therefore, it is possible to reduce the adverse affect due to the photo carriers generated by the light reached to the p-type Si substrate, with respect to the operation of the switching element.

SUMMARY OF THE INVENTION

However, in order to pursue brightness, more intense light intensity is required, and in order to pursue cost reduction and compactness, smaller panel size is required, thereby, unit light density increases more and more. Therefore, a liquid crystal panel having stronger resistance with respect to light has been required. By merely providing an n-type semiconductor which is the same type as the type of the drain region and has an area larger than that of the drain region, such as disclosed in Japanese Patent Application Laid-Open No. H08-146458, when more intense light is entered, there is a possibility that the adverse affect due to the photo carriers with respect to the operation of the switch element can not be sufficiently reduced.

The object of the present invention is to achieve a reflection type liquid crystal display apparatus with high reliability whose operation does not degrade even when an intense light is entered, and, by using the reflection type liquid crystal display apparatus, to provide a compact and low price liquid crystal projector with high brightness and high reliability.

The reflection type liquid crystal display apparatus of the present invention is devised for solving the above-mentioned problem, which includes a light transmitting substrate having a light transmitting electrode, and a first conduction type semiconductor substrate arranged in opposition to the light transmitting substrate sandwiching a liquid crystal between the light transmitting substrate and the first conduction type semiconductor substrate, and having a plurality of pixel electrodes arranged in a matrix. Where, the semiconductor substrate has a pixel including a first semiconductor region which acts as a main electrode region of a switch element electrically connected to the pixel electrodes, and has a second conduction type being opposite to the first conduction type, and a second semiconductor region which has the second conduction type, and when the unit electric charge of a second conduction type majority carrier in the first and second type semiconductor regions, is defined as Q, the product of the voltage of the second semiconductor region and the Q is smaller than the product of the voltage of the first semiconductor region and the Q.

Moreover, the reflection type liquid crystal display apparatus of the present invention includes a light transmitting substrate having a light transmitting electrode, and a first conduction type semiconductor substrate arranged in opposition to the light transmitting substrate sandwiching a liquid crystal between the light transmitting substrate and the first conduction type semiconductor substrate, where a plurality of pixel electrodes are arranged in a matrix. Where, the semiconductor substrate has a pixel including a first semiconductor region which acts as a main electrode region of a switch element electrically connected to the pixel electrode and has a second conduction type being opposite to the first conduction type, and a second semiconductor region which has the second conduction type, and when the majority carrier of the second conduction type is an electron, the voltage of the second semiconductor region is higher than the reference value of the voltage of the first semiconductor region.

Moreover, the reflection type liquid crystal display apparatus of the present invention includes a light transmitting substrate having a light transmitting electrode, and a first conduction type semiconductor substrate arranged in opposition to the light transmitting substrate sandwiching a liquid crystal between the light transmitting substrate and the first conduction type semiconductor substrate, and having the plurality of pixel electrodes arranged in a matrix. Where, the semiconductor substrate has a pixel including a first semiconductor region which acts as a main electrode region of a switch element electrically connected to the pixel electrode and has a second conduction type being opposite to the first conduction type, and a second semiconductor region which has the second conduction type, and when the majority carrier of the second conduction type is a hole, the voltage of the second semiconductor region is lower than the reference value of the voltage of the first semiconductor region.

The reflection type liquid crystal display apparatus of the present invention includes a light transmitting substrate having a light transmitting electrode, and a second conduction type semiconductor substrate arranged in opposition to the light transmitting substrate sandwiching a liquid crystal between the light transmitting substrate and the second conduction type semiconductor substrate, and having a first conduction type well where a plurality of pixel electrodes are arranged in a matrix. Where, the semiconductor substrate has a pixel in the well, including a first semiconductor region which acts as a main electrode region of a switch element electrically connected to the pixel electrodes, and has a second conduction type being opposite to the first conduction type, and a second semiconductor region which has the second conduction type, and when the unit electric charge of a second conduction type majority carrier in the first and second conduction type regions, is defined as Q, the product of the voltage of the second semiconductor region and the Q is smaller than the product of the voltage of the first semiconductor region and the Q.

Moreover, the reflection type liquid crystal display apparatus of the present invention includes a light transmitting substrate having a light transmitting electrode, and a second conduction type semiconductor substrate arranged in opposition to the light transmitting substrate sandwiching a liquid crystal between the light transmitting substrate and the second conduction type semiconductor substrate, and having a first conduction type well where a plurality of pixel electrodes are arranged in a matrix. Where, the semiconductor substrate has a pixel in the well, including a first semiconductor region which is used as a main electrode region of a switch element electrically connected to the pixel electrode and has a second conduction type being opposite to the first conduction type, and a second semiconductor region which has the second conduction type, and when the majority carrier of the second conduction type is an electron, the voltage of the second semiconductor region is higher than the reference value of the voltage of the first semiconductor region.

Moreover, the reflection type liquid crystal display apparatus of the present invention includes a light transmitting substrate having a light transmitting electrode, and a second conduction type semiconductor substrate arranged in opposition to the light transmitting substrate sandwiching a liquid crystal between the light transmitting substrate and the second conduction type semiconductor substrate, and having a first conduction type well where a plurality of pixel electrodes are arranged in a matrix. Where, the semiconductor substrate has a pixel in the well, including a first semiconductor region which acts as a main electrode region of a switch element electrically connected to the pixel electrode and has a second conduction type being opposite to the first conduction type, and a second semiconductor region which has the second conduction type, and when the majority carrier of the second conduction type is a hole, the voltage of the second semiconductor region is lower than the reference value of the voltage of the first semiconductor region.

Moreover, the reflection type liquid crystal display apparatus of the present invention includes a light transmitting substrate having a light transmitting electrode, and a first conduction type semiconductor substrate arranged in opposition to the light transmitting substrate sandwiching a liquid crystal between the light transmitting substrate and the first conduction type semiconductor substrate, and having a plurality of pixel electrodes arranged in a matrix. Where, the semiconductor substrate has a first semiconductor region which acts as a main electrode region of a switch element electrically connected to the pixel electrode and has a second conduction type being opposite to the first conduction type, and a second semiconductor region which is provided to at least a part of the periphery of the first semiconductor region and has the first conduction type.

Moreover, the reflection type liquid crystal display apparatus of the present invention includes a light transmitting substrate having a light transmitting electrode, and a second conduction type semiconductor substrate arranged in opposition to the light transmitting substrate sandwiching a liquid crystal between the light transmitting substrate and the second conduction type semiconductor substrate, and having a first conduction type well where a plurality of pixel electrodes are arranged in a matrix. Where, the well has a first semiconductor region which acts as a main electrode region of a switch element electrically connected to the pixel electrode and has a second conduction type being opposite to the first conduction type, and a second semiconductor region which is provided to at least a part of the periphery of the first semiconductor region and has the first conduction type.

According to the present invention, even when a light enters in a semiconductor substrate and a photo carrier is generated, it is possible to suppress the further movement of the photo carrier to the first semiconductor region, that is a floating part, thus enabling to avoid malfunction of a circuit. In other words, according to the present invention, reflection type liquid crystal display apparatuses which have a resistance with respect to light leakage, high brightness and high reliability, can be obtained. Moreover, by using the apparatuses, it is possible to construct a liquid crystal projector system with high intensity and high reliability.

Further features of the present invention will become apparent from the following description of exemplary embodiments with reference to the attached drawings.

BRIEF DESCRIPTION OF THE DRAWINGS

FIG. 11A is a plan view of the pixel part of a liquid crystal display apparatus in Embodiment 7 of the present invention.

DESCRIPTION OF THE EMBODIMENTS

Hereinafter, with reference to drawings, embodiments of the present invention will be described in detail.

Embodiment 1

Figure 1:
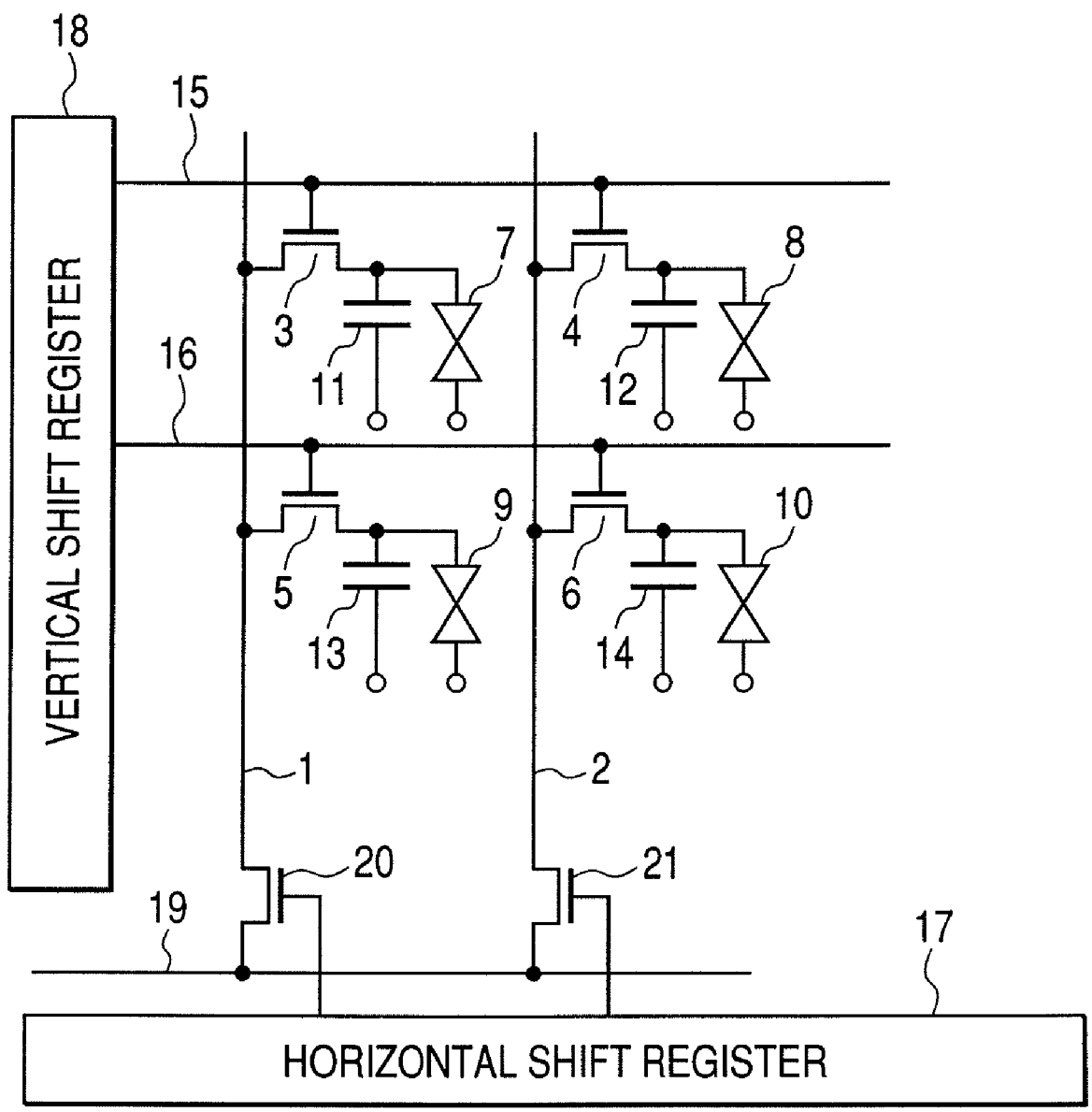
FIG. 1 is an equivalent circuit diagram of a liquid crystal display apparatus of the present invention.

Now, Embodiment 1 of the present invention will be described in detail, based on FIG. 1. FIG. 1 is an equivalent circuit diagram illustrating a configuration of the reflection type liquid crystal display apparatus according to the present invention.

In FIG. 1, signal lines 1 and 2, transistors 3 to 6, that are switch elements of a pixel part, liquid crystals 7 to 10, holding capacitors 11 to 14, drive lines (scanning lines) 15 and 16, a horizontal shift register 17, and a vertical shift register 18 are illustrated. Moreover, a video line 19, and sampling switches 20 and 21 are illustrated.

Next, the operation of the reflection type liquid crystal display apparatus according to this embodiment will be briefly described. In FIG. 1, two pixels are described by a matrix with 2 pixels, however, the present invention is not limited to this, in a practical reflection type liquid crystal display apparatus, there is a matrix of X pixels×Y pixels (for example, 1280 pixels×720 pixels, and 1920 pixels×1080 pixels).

First, in order to cause the transistors 3 and 4 to be in an on state, a drive signal is input in the drive line 15 from the vertical shift register 18. During being in the on state, the sampling switches 20 and 21 are operated one by one using the horizontal shift register 17, and a video signal is transmitted to the signal lines 1 and 2 from the video line 19. In other words, first the sampling switch 20 is opened, and the video signal of the video line 19 is transmitted to the signal line 1. Then, an electric charge is accumulated in the holding capacitor 11 through the pixel switch 3, and a voltage is applied to the liquid crystal 7.

Subsequently, after the sampling switch 20 is closed, the sampling switch 21 is opened, and the video signal of the video line 19 is transmitted to the signal line 2. Then, the video signal is written in the holding capacitor 12 through the pixel switch 4. In this sequence, pixels are sequentially written in the X direction (the horizontal direction, in the figure, the aligning direction of the transistors 3 and 4 in the figure).

After the signals are written in all pixels of the first line, the transistors 3 and 4 to be connected to the drive line 15 by the vertical shift register 18 are turned off. Next, in order to write signals in the pixels of the second line, a drive signal is input in the drive line 16 from the vertical shift register 18 so that the transistors 5 and 6 become in an on state. The subsequent operation is the same as the operation of the pixels of the first line. After signals are written in all of the pixels, this operation is repeated again.

Figure 2A:
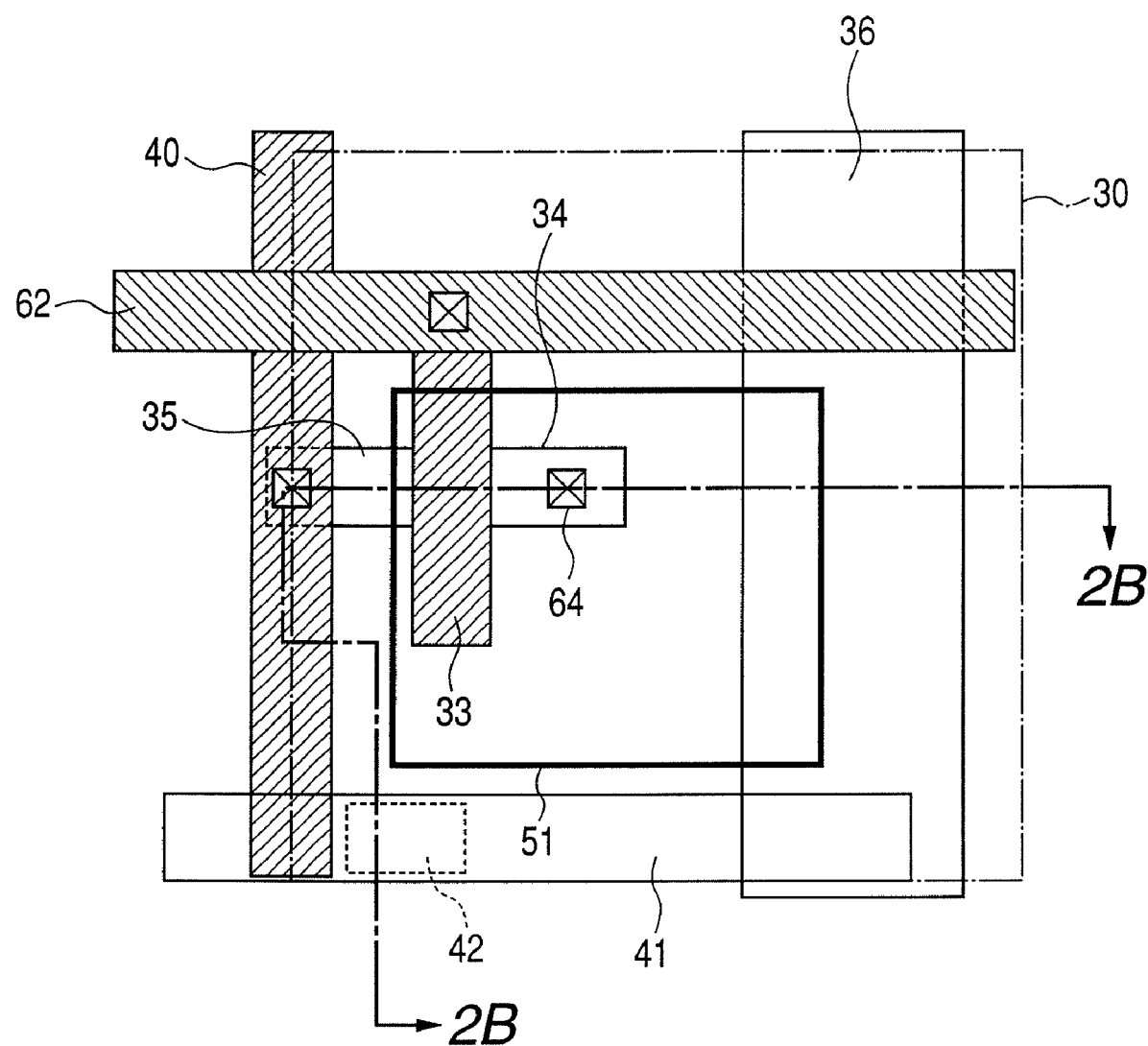
FIG. 2A is a plan view of the pixel part of a liquid crystal display apparatus in Embodiment 1 of the present invention.
Figure 2B:
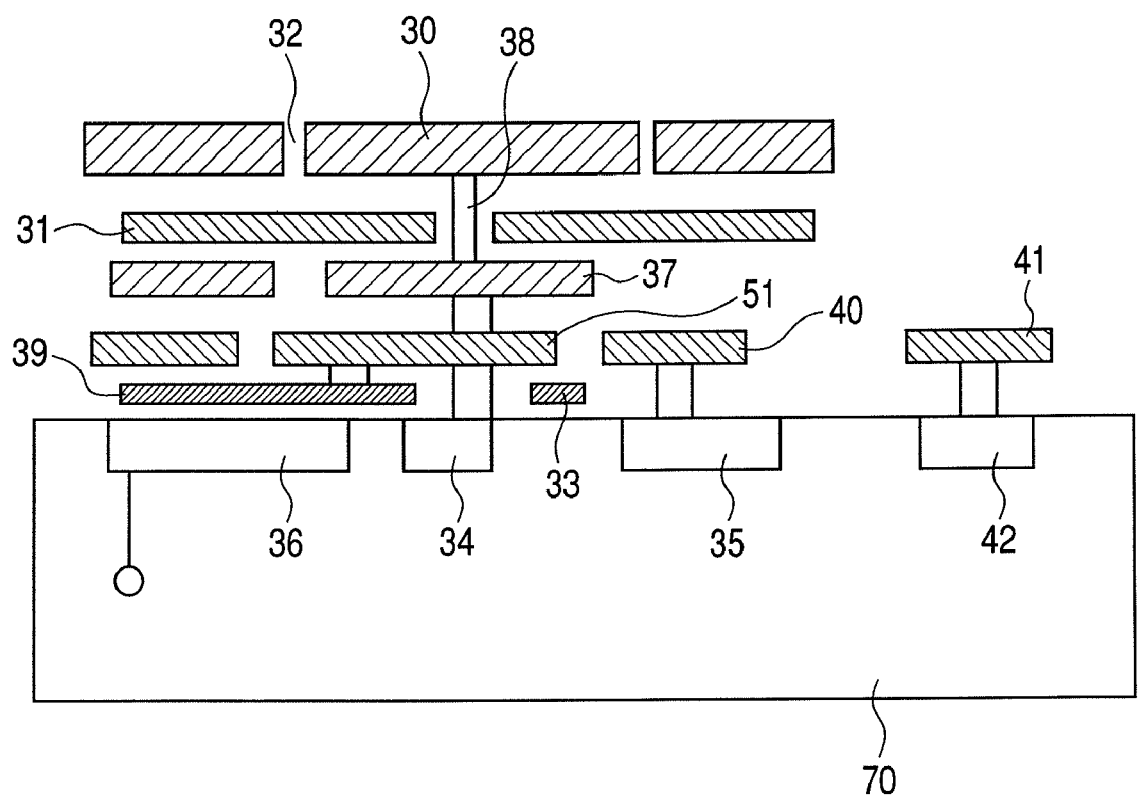
FIG. 2B is a cross-sectional view of the pixel part of a liquid crystal display apparatus in Embodiment 1 of the present invention.

FIGS. 2A and 2B are a plan view and a schematic cross-sectional view respectively illustrating the pixel configuration of the reflection type liquid crystal display apparatus of this embodiment. FIG. 2A is a plan view of the pixel layout of this embodiment, and FIG. 2B is a cross-sectional view along the line 2B-2B in FIG. 2A. In addition, in FIG. 2B, the insulating layer between each layers are eliminated for simplification except for an insulating layer 32.

In FIGS. 2A and 2B, reflective electrode 30 to be a pixel electrode, a light shielding film 31 provided below the reflective electrode 30, an insulating film 32 between the reflective electrodes 30, and a gate electrode 33 made of poly-silicon, are illustrated. A through-hole 38 is a plug for connecting the reflective electrode 30, an underlying wire 37, and an underlying layer 51. A drain region electrode 34 of a transistor that is the switch element of a pixel is connected to the reflection electrode 30. A source region 35 of the transistor is connected to a signal line 40. Electric charges from the signal line 40 are transferred to the drain region 34 by means of controlling of the electrode 33. A diffusion region 36 has the same conduction type as the conduction types of the drain region 34 and the source region 35. A capacitor (corresponding to the holding capacitors 11 to 14) is formed with an electrode 39 whose voltage is the same as the voltage of the reflection electrode and the diffusion region 36 disposed in opposition to the electrode 39. As for the reflection electrode 30, it is suitable to use a film of a metal, such as Al, AlSi, AlCu, Ti, Ta, W, Ag, Pt, Ru, Ni, Au, and TiN, or the compound film of these metal. However, the reflective electrode 30 is not limited to these materials in particular. In any case of using these metals, a reflex index can be improved by means of polishing. Although, in FIG. 2, an electrode of the capacitor is provided, the electrode of the capacitor may be provided on a semiconductor substrate separately. A first conductive type semiconductor substrate 70 is a p-type Si substrate. In addition, in this embodiment, as the p-type Si substrate, an n-MOS transistor is used. Therefore, the drain region 34, the source region 35, and the diffusion region 36, are n-type impurity semiconductor regions having a second conduction type.

Here, the light reaching to a semiconductor substrate or a semiconductor region, is a light mainly leaking from the insulating film 32 between reflective electrodes, and therefore, there is no problem, if the light is attenuated and absorbed by the light shielding film 31 without reaching to the semiconductor substrate or the semiconductor region. However, the light from a light source is strong, the light enters the semiconductor substrate or the semiconductor region without being perfectly attenuated and absorbed by the light shielding film 31. Once the light enters, a pair of an electron and a hole is generated and becomes photo carriers. Since, in this embodiment, the n-MOS transistor is formed on the p-type Si substrate 70, the hole passes through from a contact region 42, where a substrate potential is lowest, to the electrode 41. On the other hand, the electron drifts to a highest potential part, and passes through the part from, for example the source region 35. Here, if the generated electron is trapped by the drain region 34, the voltage of the portion that is in a floating state, will be decreased, resulting in undesirable display properties.

As illustrated in FIGS. 1, 2A and 2B, a pixel has at least a switch element connected to a reflective electrode, and a holding capacitor connected to the switch element. In this embodiment, the region of the pixel in the p type Si substrate 70 includes the drain region 34, the source region 35, and the diffusion region 36. Although the contact region 42 can be provided to each pixel, and can be included in the region of a pixel, the contact region 42 can also be provided to every plurality of pixels, for example, one contact region can be provided to every four pixels. Here, the diffusion region 36 constitutes one electrode of the holding capacitor, however, another diffusion region constituting one electrode of the holding capacitor can be provided separately from the diffusion region for absorbing photo carriers. In this case, the drain region 34, the source region 35, and the diffusion region for absorbing photo carriers, and other diffusion regions, are included in the region of a pixel.

In this embodiment, the voltage of the diffusion region 36 for forming a capacitor is set to a value higher than the reference value of the voltage applied to the drain region 34. For example, when the reference value is set to 7 V using a vertically oriented liquid crystal, a voltage of 7 V±5 V is applied to the drain region due to an alternating current drive. In this case, for example, the voltage applied to the diffusion region 36 is set to 8 V that is higher than the reference value of the voltage applied to the drain region 34. By setting in this manner, a configuration where the electrons of the photo-carriers generated in a substrate are rapidly gathered in the diffusion region 36, and hardly gathered in the floating part of the drain region 34, is obtained, thus enabling to suppress the degradation of the display properties. It is to be noted that the voltage is defined as a potential difference from a ground potential as a reference.

The above example will be represented by general notations. When the unit electric charge of majority carriers is determined as Q, since, if the majority carriers are electrons, the unit electric charge $Q=-q$ (where $q=1.6\times10^{-19}$ C), the product of the unit electric charge in the drain region 34 and the reference value of the voltage becomes to $-7$ q. If the voltage of the diffusion region 36 is set to 8 V, the product of the unit electric charge and the voltage in the diffusion region 36 becomes to $-8$ q, which is smaller than the product of the unit electric charge and the reference value of the voltage in the drain region 34. In this manner, by causing the product of the unit electric charge and the voltage in the diffusion region 36 to be smaller than the product of the unit electric charge and the reference value of the voltage in the drain region 34, such a potential gradient where electrons flow into the drain region 34, is generated, thus resulting in that electrons that are photo carriers, are absorbed by the diffusion region 36.

In addition, in this embodiment description is done using the form where an n-MOS transistor is used on a p type Si substrate, however, there is also no problem to use a form where a p-MOS transistor is used on an n type Si substrate. In this case, since the photo carriers are holes, in order to cause the voltage of the diffusion region 36 lower than the reference value 7 V applied to the drain region 34, with respect to the holes that are the major carriers, for example the voltage applied to the diffusion region 36 is set to 6 V. At that time, since the majority carriers are holes, the unit electric charge becomes as $Q=q$, and the product of the unit electric charge and the reference value of the voltage in the drain region 34 is becomes to 7 Q. If the voltage of the diffusion region 36 is set to 6 V, the product of the unit electric charge and the voltage in the diffusion region 36 becomes to 6 q, which is smaller than the product of the unit electric charge and the reference value of the voltage in the drain region 34. In this manner, by causing the product of the unit electric charge and the voltage in the diffusion region 36 to be smaller than the product of the unit electric charge and the reference value of the voltage in the drain region 34, such a potential gradient where holes flow into the drain region 34, is generated, thus resulting in contribution in that holes that are photo carriers, are absorbed by the diffusion region 36.

Moreover, when an n-MOS transistor is used on a p type Si substrate, in order to absorb photo carriers more strongly using the diffusion region 36, it is preferable to cause the voltage of the diffusion region 36 to be larger than 12 V that is the maximum voltage of the drain region in a drive period. This enables to cause the potential gradient to be sharp, thus more electrons easily flow into the diffusion region 36. In addition, in this embodiment, a case where an MOS transistor is used as the switch element of a pixel, is described, however, the configuration of the switch element is not limited in particular. That is because, the present invention addresses a problem in that, when the switch element to be connected to the pixel electrode is in an off state, if electric charges are collected in a semiconductor region to be one main electrode region of the switch element being in a floating state, an adverse affect will be given to the display properties. Moreover, in this embodiment, although the diffusion region 36 constitutes one electrode of the capacitor, the diffusion region 36 may be provided separately from the diffusion region constituting one electrode of the capacitor.

Figure 3:
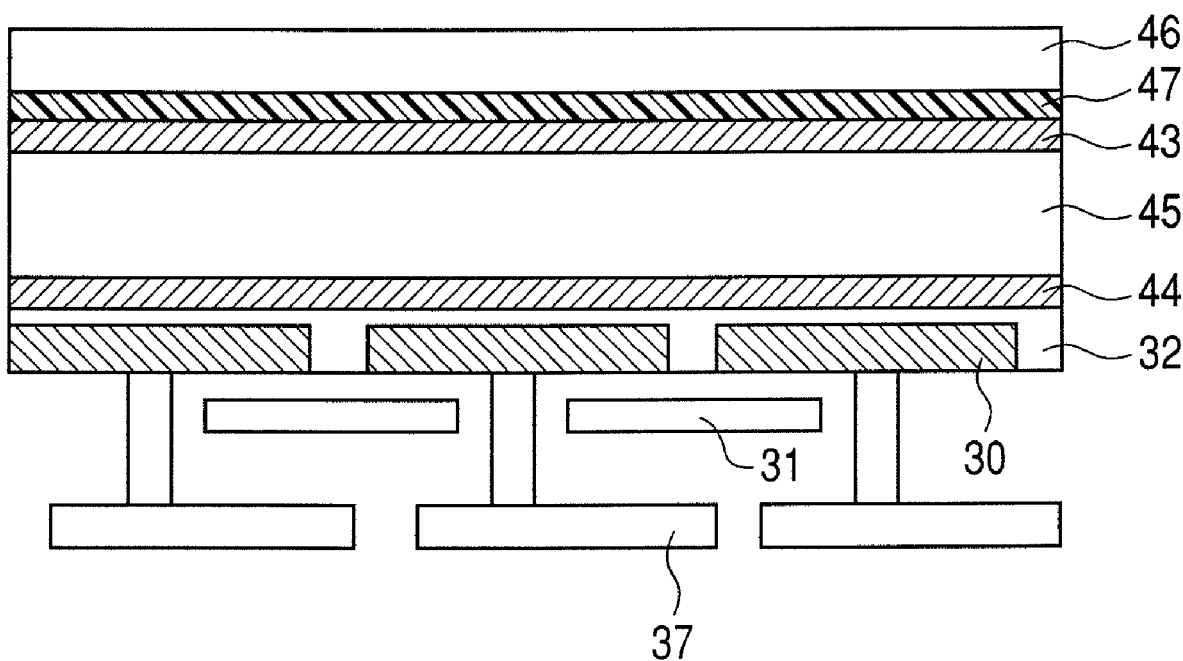
FIG. 3 is a cross-sectional view of a liquid crystal display apparatus according to the present invention.

FIG. 3 is a cross-sectional view of the pixel part of a liquid crystal panel of this embodiment. A glass substrate 46 to be an optical light transmitting substrate, a light transmitting electrode 47 such as ITO, an obliquely vapor deposition (evaporation) (alignment) film at the ITO side 43, an obliquely evaporated electrode at the reflection electrode side 44, and a liquid crystal 45, are illustrate. Although, in this embodiment, a vertically oriented liquid crystal is used, the liquid crystal is not limited to such a liquid crystal in particular. Moreover, although a film with a structure of an anti-reflection film is laminated on the rear surface of the glass side, here, the film is eliminated.

Figure 4:
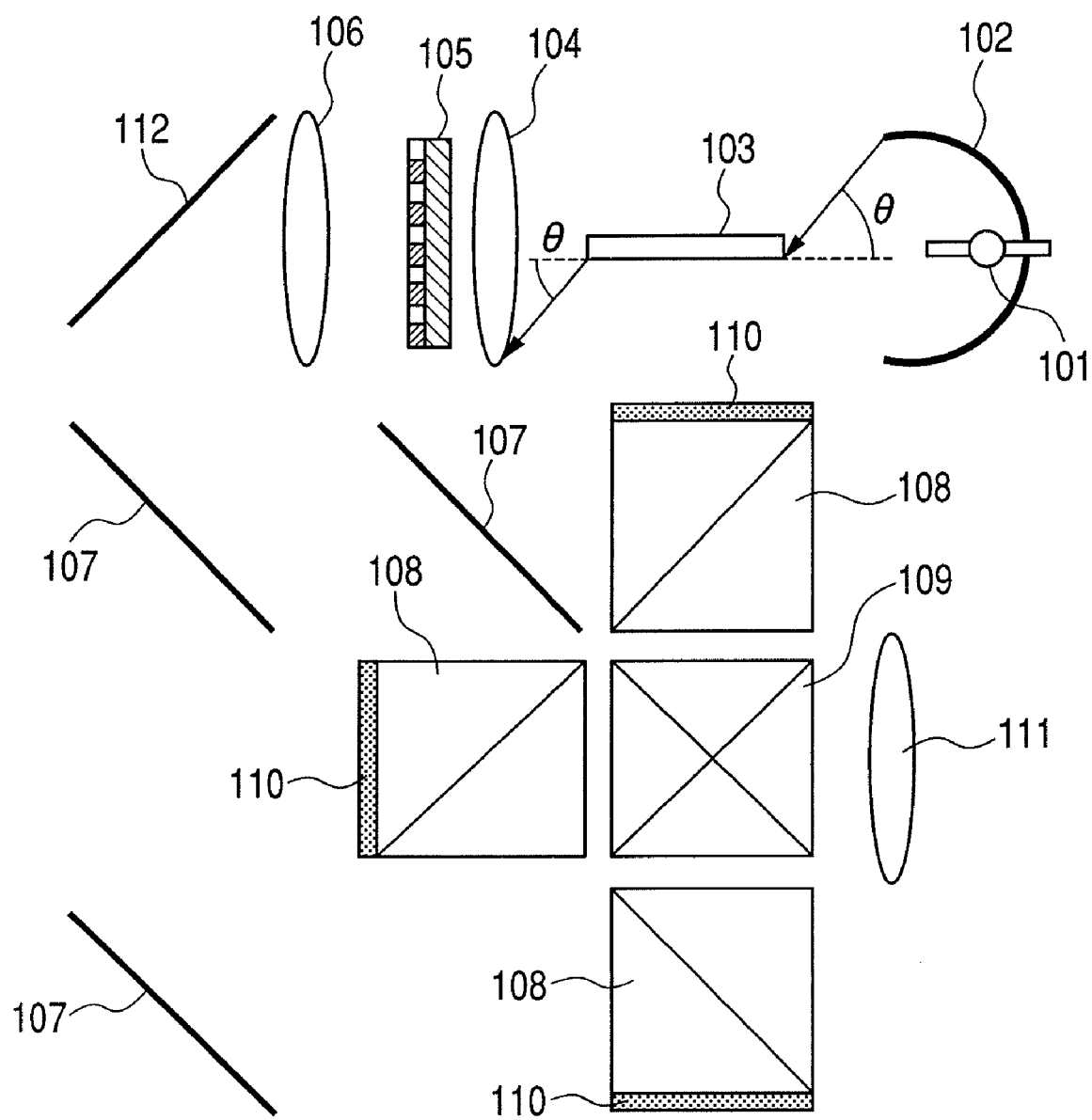
FIG. 4 is a view describing a liquid crystal projector using a liquid crystal display apparatus according to the present invention.

Next, using FIG. 4, a liquid crystal projector system using a reflection type liquid crystal display apparatus of the present invention will be described. FIG. 4 is a view of one example of the liquid crystal projector system using a reflection type liquid crystal display apparatus of the present invention. A lamp 101, a reflector 102, a rod integrator 103, a collimator lens, a polarized light transformation system 105, a relay lens 106, dichroic mirror 107, and a polarized beam splitter 108, are illustrated. Moreover, a cross prism 109, a reflection type liquid crystal display apparatus of the present invention 110, a projection lens 111, and a total reflection mirror 112, are illustrate. A light flux output from the lamp 101 is reflected by the reflector 102 and condensed in the entrance of the integrator. The reflector 102 is an elliptic reflector, and the focal points thereof are present in the light emission part and the entrance of the integrator. The light flux entered the integrator 103 is reflected inside the integrator zero to several times, and forms a secondary light source image in the exit of the integrator. Although as a method for forming the secondary light source image, a method using a fly-eye is present, here, it is eliminated. The light flux from the secondary light source is caused to be substantially parallel lights through the collimator lens 104, and enters the polarized light beam splitter 105 of the polarized light transforming system. P waves are reflected by the polarized light beam splitter 105, all of the P waves are converted into S waves by passing thought a λ/2 plate, and the S waves enter the relay lens 106. The light flux is condensed on a panel by the relay lens 106. While the light flux is condensed on a panel, a color separation system is configured with the color separation dichroic mirror 107, a polarizing plate (not illustrated), the polarized light beam splitter 108, and the crossing prism 109, and the S waves enter each of the prepared three reflection type liquid crystal display apparatuses 110 of the present invention. In the reflection type liquid crystal display apparatus 110 of the present invention, a voltage is controlled every pixels by being matched with a screen image. After modulating the S wave of the screen image into an elliptic polarized light (or an linear polarized light), transmitting the component of the P wave using the polarized light beam splitter 108, and then synthesizing the color thereof by the cross prism 109, the screen image is projected from the projection lens 111.

Next, using FIGS. 2A and 2B or FIG. 3, the manufacturing method of a reflection type liquid crystal display apparatus of the present invention will be described.

By means of a partial thermal oxidation of the p type Si substrate 70, a field oxide film such as a LOCOS (Local Oxidation of Silicon) oxide film is formed. Further, by subjecting the thermal oxidation to the substrate again, a gate oxide film with a thickness of 600 angstroms is formed. Subsequently, after patterning, by ion-implanting phosphorus in the substrate at a doze of $10^{15}$ cm$^{-2}$ order, the diffusion region 36 whose impurity concentration is $10^{18}$ cm$^{-3}$ order is formed. Subsequently, the gate electrode 33 and the electrode 39, made of n type polysilicon doped with phosphorus at an order of $10^{20}$ cm$^{-2}$, are formed. Then, by ion-implanting phosphorus in the substrate at a doze of $10^{12}$ cm$^{-2}$ order, an n-type low concentration drain is formed, which is an n-type impurity semiconductor region with an impurity concentration of $10^{16}$ cm$^{-3}$ order. By depositing an oxide film on the substrate by means of a CVD process, and, by means of an etching back process, the oxide film is removed except for the side walls of the polysilicon electrode 39 and polysilicon gate electrode 33. After that, using a patterned photoresist as a mask, by ion-implanting phosphorus in the substrate at a doze of $10^{15}$ cm$^{-2}$ order, the source region 35 and the drain region 34, whose impurity concentration is $10^{19}$ cm$^{-3}$ order, are formed, and, thereby, an n-MOS transistor is formed. Similarly, a p-MOS transistor is formed.

After that, an interlayer insulation film is formed on the entire surface of the substrate. As the interlayer insulation film, an insulation film such as PSG (Phospho-silicate Glass) and NSG (Non-dope Silicate Glass)/BPSG (Boro-Phospho-Silicate Glass), or TEOS (Tetraetoxy-silane), is applicable. By patterning a contact hole directly above the source region 35 and the drain region 34, by evaporating Al thereon by means of sputtering, and subsequently by patterning the evaporated Al, first metal conductive layers such as the signal line 40, the electrode 41, and the underlying layer 51, are formed. In order to improve the ohmic contact property between the first metal conductive layer and the source region or the drain region, it is desirable to form a barrier metal such as a lamination film of Ti and TiN between the first metal conductive layer and the source region 35 or the drain region 34. After that, an interlayer insulating film and a second metal conductive film such as the underlying wire 37 are laminated and formed, subsequently, a metal film that is the light shielding film 31, is formed. The metal film is, for example, a metal such as Ti, TiN, or Al, or a lamination film thereof, and is not limited in particular. Using the layer, main lights are shielded.

After patterning the film and subsequently an interlayer insulating film is formed further, a plug is opened. Subsequently, after depositing W in the plug, the surface is flattened by means of a CMP process. After that, by means of a sputtering process, a reflection electrode layer is deposited on the surface at a thickness of about 200 nm, and by patterning the surface, the reflection electrode 30 is formed. After that, by means of a plasma enhanced CVD process, a silicon oxide film as the protective film 32 is formed on the surface at a thickness of 100 nm. Furthermore, using an oblique vapor deposition apparatus, as the obliquely vapor deposition (alignment) film 44, a silicon oxide film for orienting the liquid crystal is formed on the surface at a thickness of about 100 nm.

Similarly, on the light transmitting electrode 47 of the glass substrate 46, using the oblique vapor deposition apparatus, a silicon oxide film was also formed as the obliquely vapor deposition (alignment) film 43, at a thickness of about 100 nm, and subsequently the p-type substrate 70 and the glass substrate 46 were laminated. By inserting a vertically oriented liquid crystal between the laminated substrates, and taking electrodes by means of wire bonding, a reflection type liquid crystal display apparatus was produced. When being produced using three of the reflection type liquid crystal display apparatuses, a liquid crystal projector system with high brightness and high reliability could be obtained.

Embodiment 2

Figure 5:
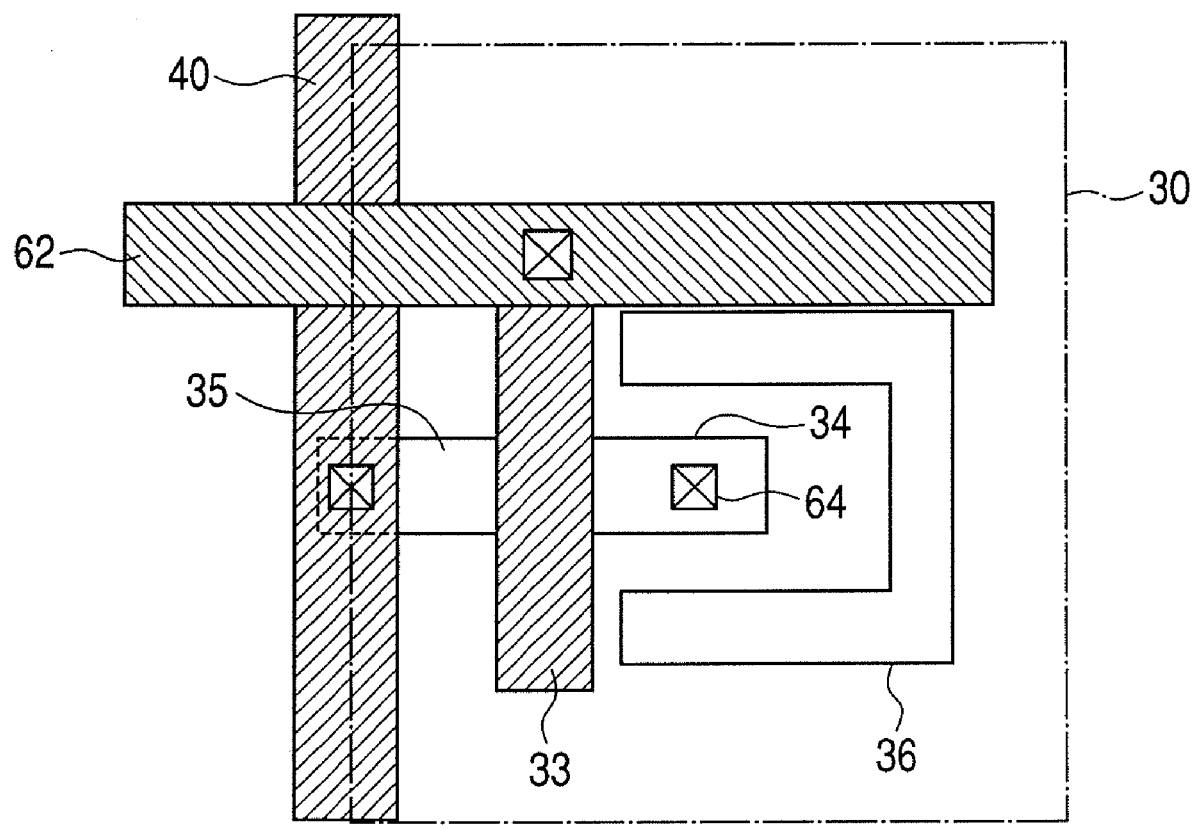
FIG. 5 is a plan view of the pixel part of a liquid crystal display apparatus in Embodiment 2 of the present invention.

The Embodiment 2 of the present invention will be described based on FIG. 5. FIG. 5 is a plan view of a pixel layout for illustrating the pixel configuration of a reflection type liquid crystal display apparatus according to Embodiment 2. In Embodiment 2, the diffusion region 36 of the Embodiment 1 is arranged in an U shape. In Embodiment 2, an n-type diffusion region 36 that is a suction port of the photo carriers is arranged in an U shape so as to surround the periphery of a drain region 34. The n-type diffusion region 36 can be provided so as to surround except for a channel region where a gate electrode 33 connected to a gate wiring 62 and a region between a source region 35 and a drain region 33, are superposed. In addition, the n-type diffusion region 36 that is the suction port of the photo carriers is not limited to the U shape, for example, the n-type diffusion region 36 may be provided so as to surround the surroundings of the drain region 34 in an L shape viewed from the substrate surface of a p-type Si substrate 70.

Embodiment 3

Now, Embodiment 3 of the present invention will be described in detail based on FIGS. 6A and 6B.

Figure 6A:
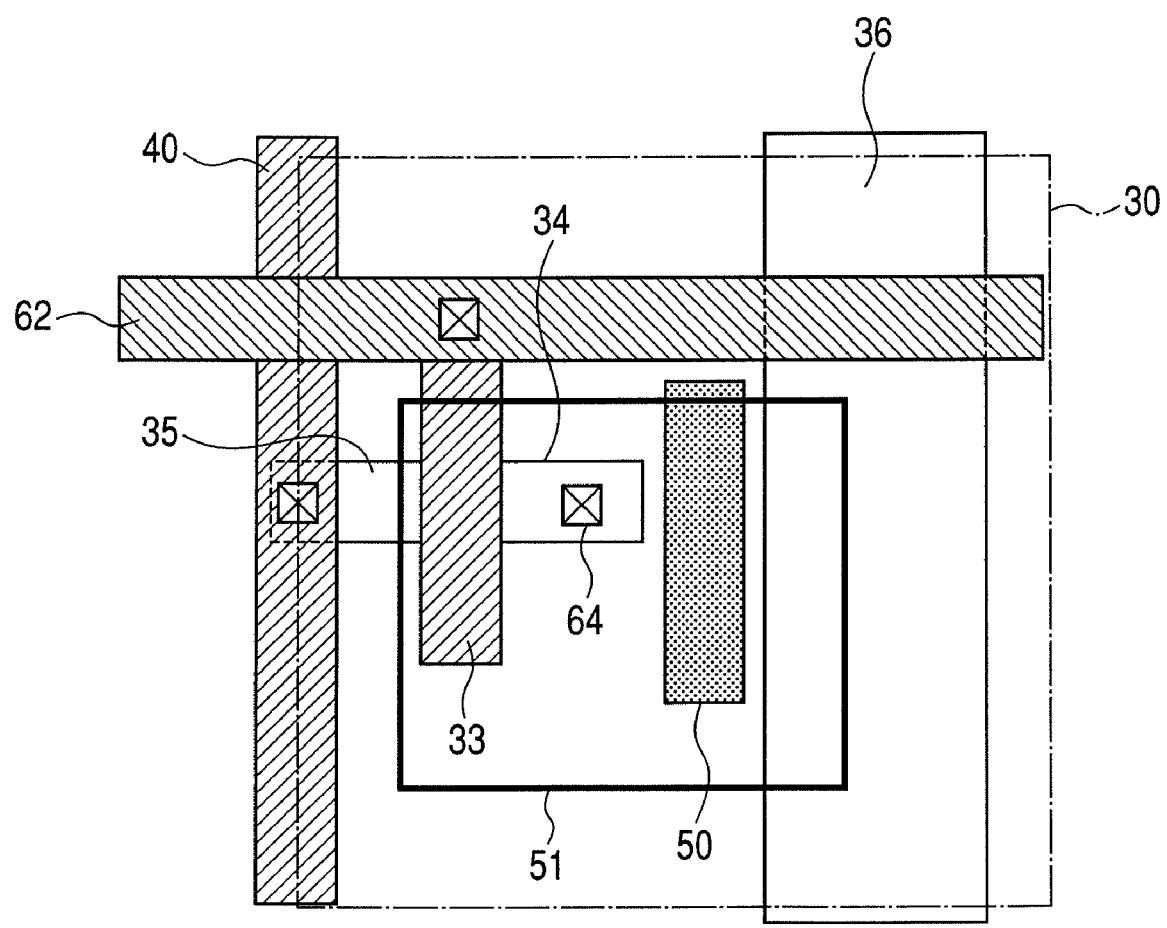
FIG. 6A is a plan view of the pixel part of a liquid crystal display apparatus in Embodiment 3 of the present invention.
Figure 6B:
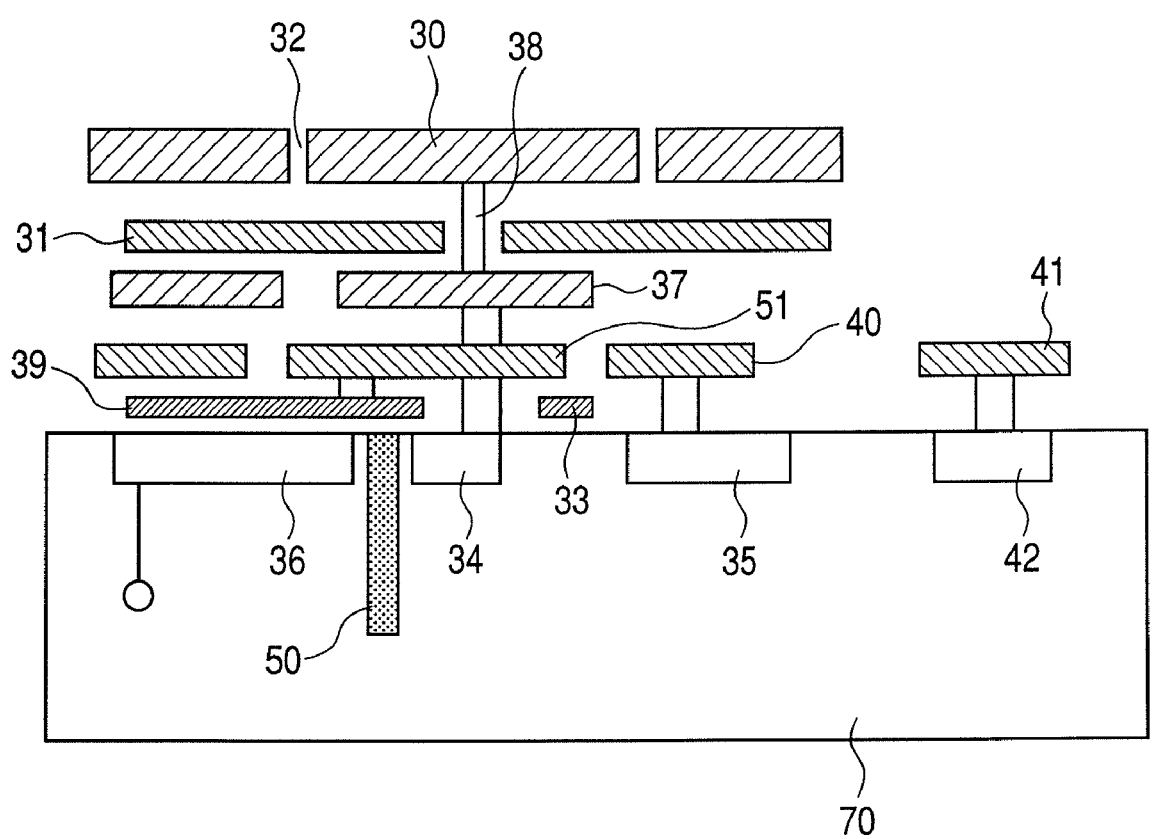
FIG. 6B is a cross-sectional view of the pixel part of a liquid crystal display apparatus in Embodiment 3 of the present invention.

In FIGS. 6A and 6B, a pixel part used for a reflection type liquid crystal display apparatus according to Embodiment 3 of the present invention. FIG. 6A is a plan view of the pixel part, and FIG. 6B is a cross-sectional view of the pixel part. Here, similar components as those in Embodiment 1, are denoted by the same reference numerals as those in Embodiment 1, and detailed description thereof will be eliminated.

In Embodiment 3, in addition to the components in Embodiment 1, a p-type region 50 is formed between a drain region 34 and a diffusion region 36. The p-type region 50 has a function of a potential barrier so that electrons, photo carriers produced inside a p type Si substrate 70, hardly reach to the drain region 34. As shown in FIG. 6B, the p type Si substrate 70 preferably locates from the surface to the deep inside of the p type Si substrate 70. However, the present invention is not limited to this in particular, and even if the p type region 50 locates only on the surface or only at the deep inside of the p type Si substrate, the barrier effect is still present, for example, by means of ion implantation, by implanting ions in multiple steps, the barrier layer may be formed. Moreover, in Embodiment 3, as the case in Embodiment 1, a diffusion region 36 has a function of the suction port of electrons. In Embodiment 3, by forming the drain region 34 in a size smaller than the size of the drain region 34 in Embodiment 1, and by shielding the drain region 34 from a light using an underlying layer 51 formed above the drain region 34, light incidence from the side immediately above the drain region 34 is suppressed. The photo carriers generated by an incident light outside the drain region 34, are suppressed from diffusing in the drain region 34 by the p type region 50 which acts as a potential barrier. Therefore, degradation of the display properties due to the light incidence is suppressed further. In this embodiment, the voltage of the diffusion region 36 is adjusted as in Embodiment 1. However, in this embodiment, the diffusion region 36 may not be provided, and even if only the p type region 50 which acts as a potential barrier, is provided, the diffusion of the photo carriers into the drain region 34 can be suppressed. In other words, in FIG. 6B, although the region of the pixel in the p type Si substrate 70 includes the drain region 34, the source region 35, the diffusion region 36, and the p type region 50; a region including the drain region 34, the source region 35, and the p type region 50, may be used as the pixel region. However, for the pixel including the diffusion region 36, whose voltage is adjusted, similar to the pixel in Embodiment 1, the diffusion of the photo carriers to the drain region 34 can be suppressed further than the pixel without the diffusion region 36.

Now, a manufacturing method of the reflection type liquid crystal display apparatus of this embodiment will be described. The fundamental steps are the same as those in Embodiment 1. The p type region 50 can be formed, for example, by forming a gate oxide film, patterning the film, and subsequently subjecting the film to ion-implantation of boron under the following three conditions of accelerating voltage: 30 KeV, 70 KeV and 140 KeV, so that the impurity concentration of the film becomes to an order of $5 \times 10^{17}$ cm$^{-3}$. Subsequently, after patterning the film, by subjecting the film to ion-implantation of phosphorous at a doze amount of $10^{15}$ cm$^{-2}$ order, the diffusion region 36 whose impurity concentration is an order of $10^{18}$ cm$^{-3}$, is formed. The other steps are the same as those of in Example 1. In addition, in this embodiment, an example of a p type substrate is described, and an n-MOS transistor is used as a pixel switch, however, there is also no problem to use an n type substrate and use a p-MOS transistor as the pixel switch. At that time, since the photo carriers are holes, the region 50 to be a potential barrier layer is an n type region.

After that, also on a light transmitting electrode 47 of a glass substrate 46, using an oblique vapor deposition apparatus, similarly, a silicon oxide film was formed at a thickness of about 100 nm, as an obliquely vapor deposition (alignment) film 43; and subsequently, the p type Si substrate 70 and the glass substrate 46 were laminated. By injecting a vertically oriented liquid crystal between the laminated substrates, and by taking out electrodes by means of wire bonding, the reflection type liquid crystal display apparatus was produced. When being produced using three of the reflection type liquid crystal display apparatuses, a liquid crystal projector system with high brightness and high reliability could be obtained.

Embodiment 4

Now, based on FIG. 7, Embodiment 4 of the present invention will be described in detail.

Figure 7:
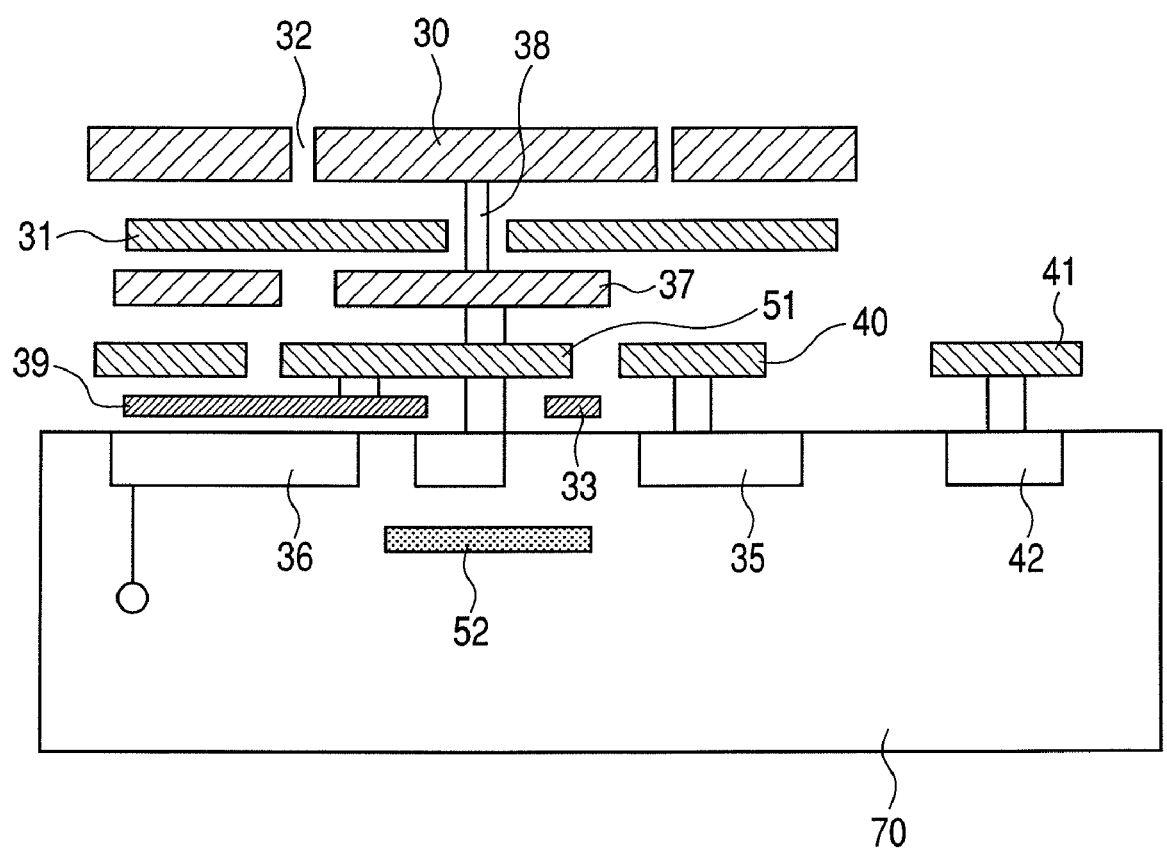
FIG. 7 is a cross-sectional view of the pixel part of a liquid crystal display apparatus in Embodiment 4 of the present invention.

FIG. 7 is a cross-sectional view of a pixel part used for a reflection type liquid crystal display apparatus of Embodiment 4 of the present invention. In this embodiment, a p type region 52 having a function of a potential barrier is formed at a part below a drain region 34. In this embodiment, as in the cases of Embodiments 1 and 3, as the suction port of electrons, a diffusion region 36 is also provided. In Embodiment 4, as in the case of Embodiment 3, by forming a drain region 34 in a size smaller than the size of the drain region 34 in Embodiment 1, and by shielding the drain region 34 from a light using an underlying layer 51 formed above the drain region 34, light incidence from the side immediately above the drain region 34 is also suppressed. The photo carriers generated by a light which entered deeply in the region below the drain region 34 by means of oblique incidence or scattering, can be suppressed from diffusing in the drain region 34 by the p type region 52 which acts as a potential barrier. Therefore, degradation of the display properties due to the light incidence is suppressed largely. Although, it is preferable for the depth of the p type region 52 to be near the drain and to be shallow so as to improve the photo carrier suppression properties and so as to increase a capacitor, the depth is arbitrarily set in consideration of designing items such as a problem of a withstanding voltage.

Figure 8:
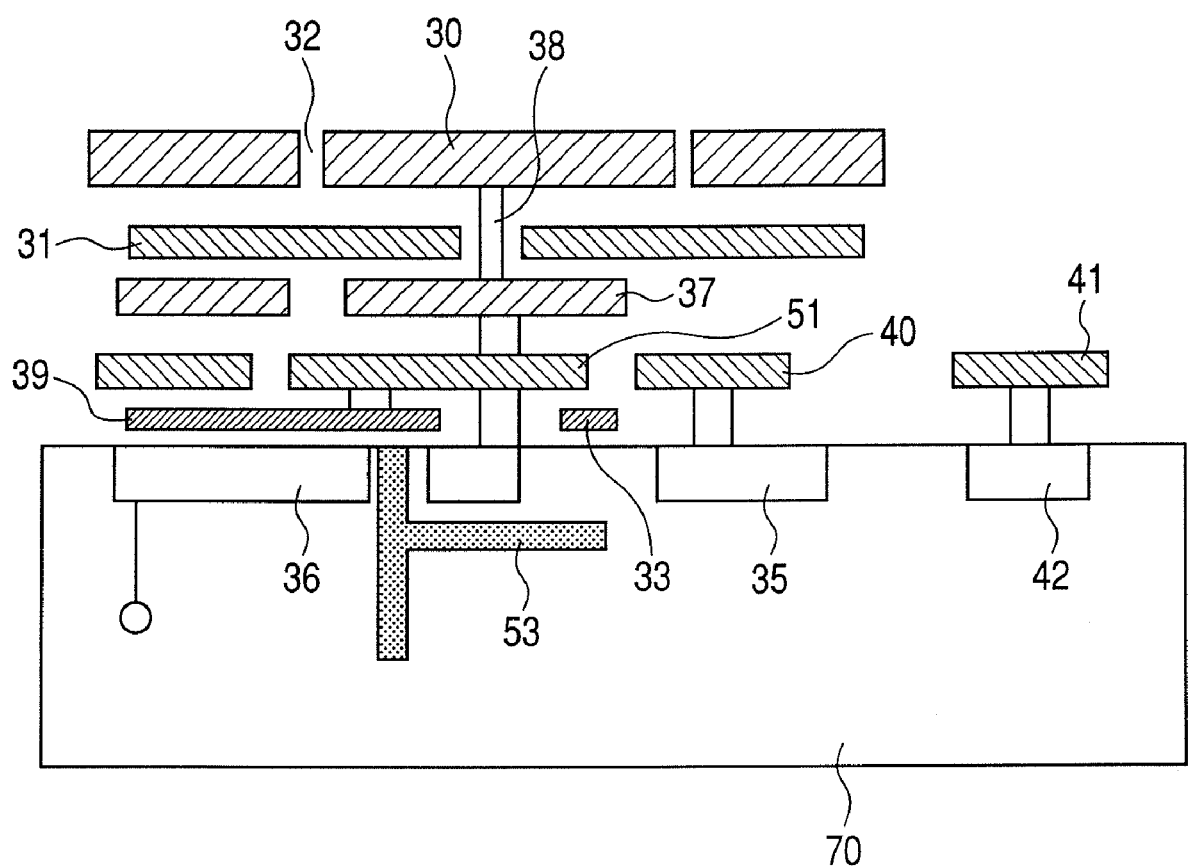
FIG. 8 is another cross-sectional view of the pixel part of a liquid crystal display apparatus in Embodiment 4 of the present invention.

Moreover, in this embodiment, the voltage of the diffusion region 36 is adjusted as the case in Embodiment 1. However, in this embodiment, the diffusion region 36 may not be provided, and even if only the p type region 52 is provided, the diffusion of the photo carriers into the drain region 34 can be suppressed. In other words, in FIG. 7, although the region of the pixel in a p type Si substrate 70 includes the drain region 34, the source region 35, the diffusion region 36, and the p type region 52; a region including the drain region 34, the source region 35, and the p type region 52, may be used as the pixel region. However, for the pixel including the diffusion region 36, whose voltage is adjusted, similar to the pixel in Embodiment 1, the diffusion of the photo carriers to the drain region 34 can be suppressed further than the pixel without the diffusion region 36. Moreover, as illustrated in FIG. 8, when a p type region 53 is formed by combining the p type region 50 in Embodiment 3, although the number of steps in a process increases, in view of suppressing photo carriers, it is of course preferable. When being produced using three of the reflection type liquid crystal display apparatuses, a liquid crystal projector system with high brightness and high reliability could be obtained.

Embodiment 5

In Embodiment 3, when viewed from on the surface of the substrate of the p type substrate 70 an example where a potential barrier of the p type region 50 is linearly provided to a part of the surroundings of the drain region 34, has been described. In this embodiment, a p type region 54 acting as a potential barrier similar to the p type region in Embodiment 3 is provided so as to surround the surroundings of a drain region 34 in a shape of letter "L" or "U" viewed from the substrate surface of the p type substrate 70.

Figure 9:
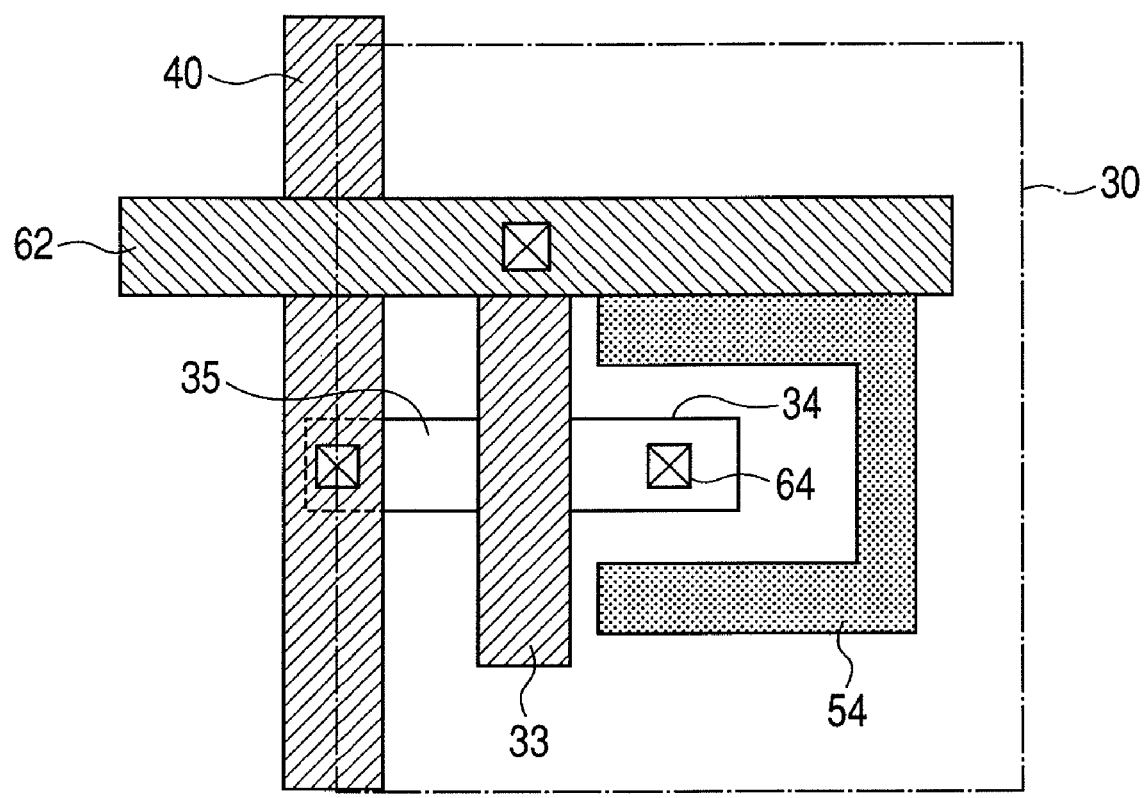
FIG. 9 is a plan view of the pixel part of a liquid crystal display apparatus in Embodiment 5 of the present invention.

FIG. 9 is a plan view of a pixel part of a reflection type liquid crystal display apparatus in Embodiment 5 of the present invention. In FIG. 9, the p type region 54 acting as a potential barrier is arranged in a shape of letter "U". In FIG. 9, the p type region 54 acting as a potential barrier is arranged in a shape of letter "U" so as to surround the periphery of the drain region 34. The p type region 54 can be provided so as to surround except for a part where a gate electrode 33 connected to the gate wiring 62, and a region between the source region 35 and the drain region 34 overlap each other, i.e., a channel region. In the p type region 54, in combination with the p type region 52 illustrated in FIG. 7, a potential barrier can also be provided so as to surround the drain region 34 including the lower part of the drain region 34. In addition, in FIG. 9, although the p type region 54 is arranged in a shape of letter "U", this embodiment is not limited to this, it may be arranged in a shape of letter "L", and provided so as to surround a part of the surroundings of the channel region.

Embodiment 6

Figure 10:
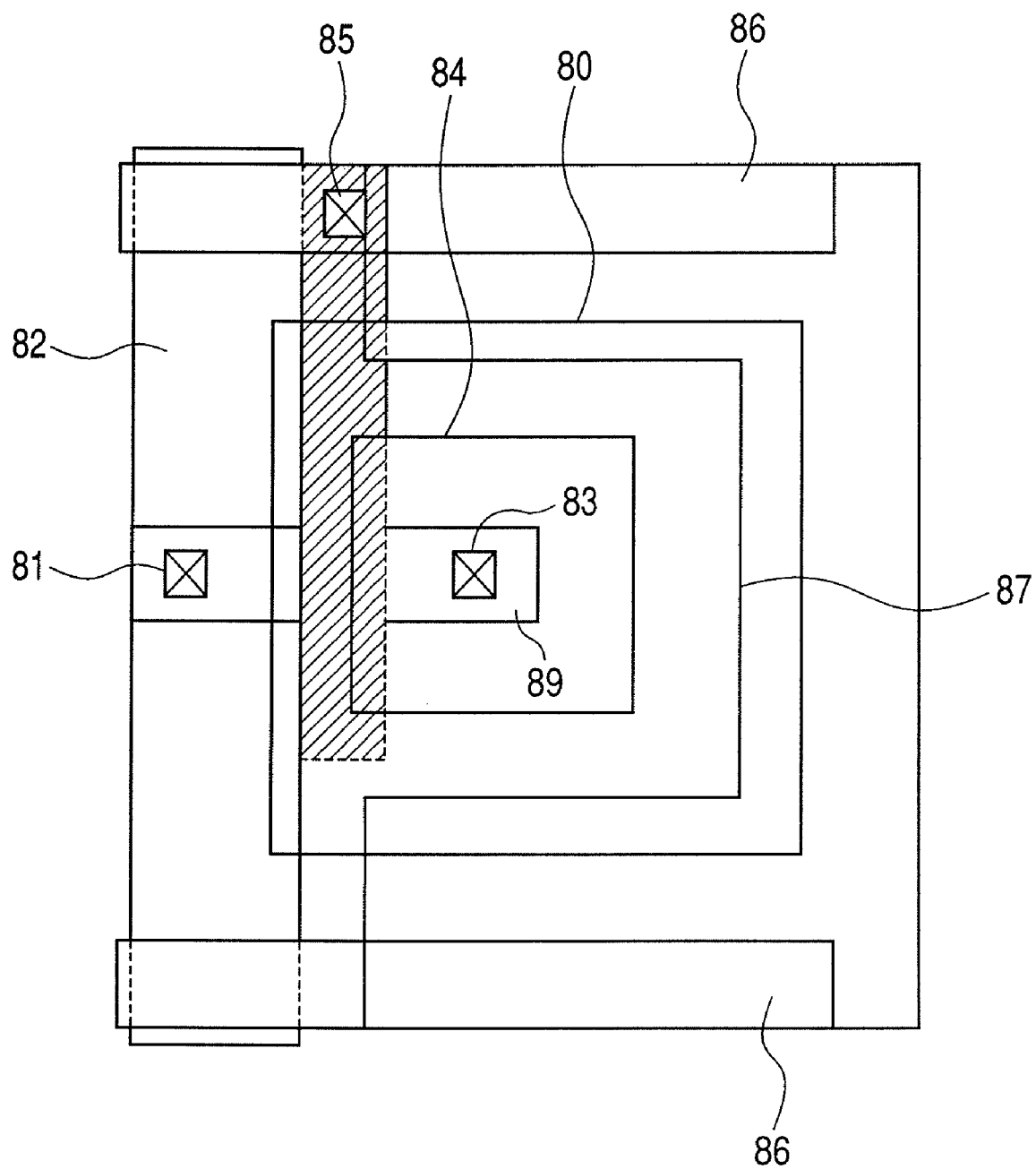
FIG. 10 is a plan view of the pixel part of a liquid crystal display apparatus in Embodiment 6 of the present invention.

FIG. 10 is plan view of a pixel part used for a reflection type liquid crystal display apparatus in Example 6 of the present invention.

As illustrated in FIG. 10, a gate line 86 is connected to the gate of a transistor via a contact region 85, and a signal from a signal line 82 is propagated to a drain region 89 connected to a reflection electrode. A region 81 is the contact region of the signal line 82. The drain region 89 and a rectangular first metal conductive layer 80 locating on the drain region 89 are connected through a contact, and connected to a rectangular second metal conductive layer 84 locating on the first metal conductive layer 80. In addition, the first and second metal conductive layers 80 and 84 may not be rectangular in particular, their shapes are set according to needs.

In this embodiment, in any direction, the size of the second metal conductive layer 84 is smaller than the size of the first metal conductive layer 80. In other words, when viewed from the side of the semiconductor substrate, the periphery of the first metal conductive layer 80 is set larger than the periphery of the second metal conductive layer 84, so that the first metal conductive layer 80 cover the second metal conductive layer 84.

A plug part 83 connects the top reflection electrode and the second metal conductive layer 84, incident light from the gap between the reflection electrodes will leak from the periphery of the plug part 83. However, by arranging the plug part 83 at the substantial center of gravity (including the center of gravity or a region substantially determined as the center of gravity) of the second metal conductive layer 84, the incident light in the semiconductor substrate can be suppressed. In this manner, the incident light is reflected by the second metal conductive layer 84. Incident light from a gap between the second metal conductive layer 84 and a metal layer 87 provided at the surroundings of the second metal conductive layer 84 and locating in the same layer as the second metal conductive layer 84, will be reflected again by the first metal conductive layer 80. In other words, when viewed from the liquid crystal side, under the gap between the second metal conductive layer 84 and the metal layer 87 which are the same conductive layer, the first metal conductive layer 80 is arranged, thereby, light shielding effect is improved.

Since, in this manner, the metal conductive layers are present in any region, as for a light in order to enter the semiconductor substrate, the light will be reflected by a plurality of times. Accordingly, by applying the wiring layout of this embodiment to Examples 1 to 5, incident light in the semiconductor substrate can be suppressed. In addition, further, thanks to the structure of the semiconductor substrate, degradation of properties due to adverse affect of photo carriers on the operation of a switch element, can be suppressed. Moreover, by causing the semiconductor region to be smaller than the metal wiring layer 80, absolute amount of the incident light in the semiconductor substrate, in particular, in the semiconductor substrate near the drain region, is largely suppressed.

Using a pixel with this configuration, a reflection type liquid crystal display apparatus was produced. When being produced using three of the reflection type liquid crystal display apparatuses, a liquid crystal projector system with high reliability could be obtained, where, even for a high brightness incident light, degradation of properties due to leakage of the light was not occurred.

Embodiment 7

Now, Embodiment 7 of the present invention will be described based on FIGS. 11A and 11B. In addition, same components as those in Embodiment 1 are denoted by same reference numerals, and their description will be eliminated.

Figure 11B:
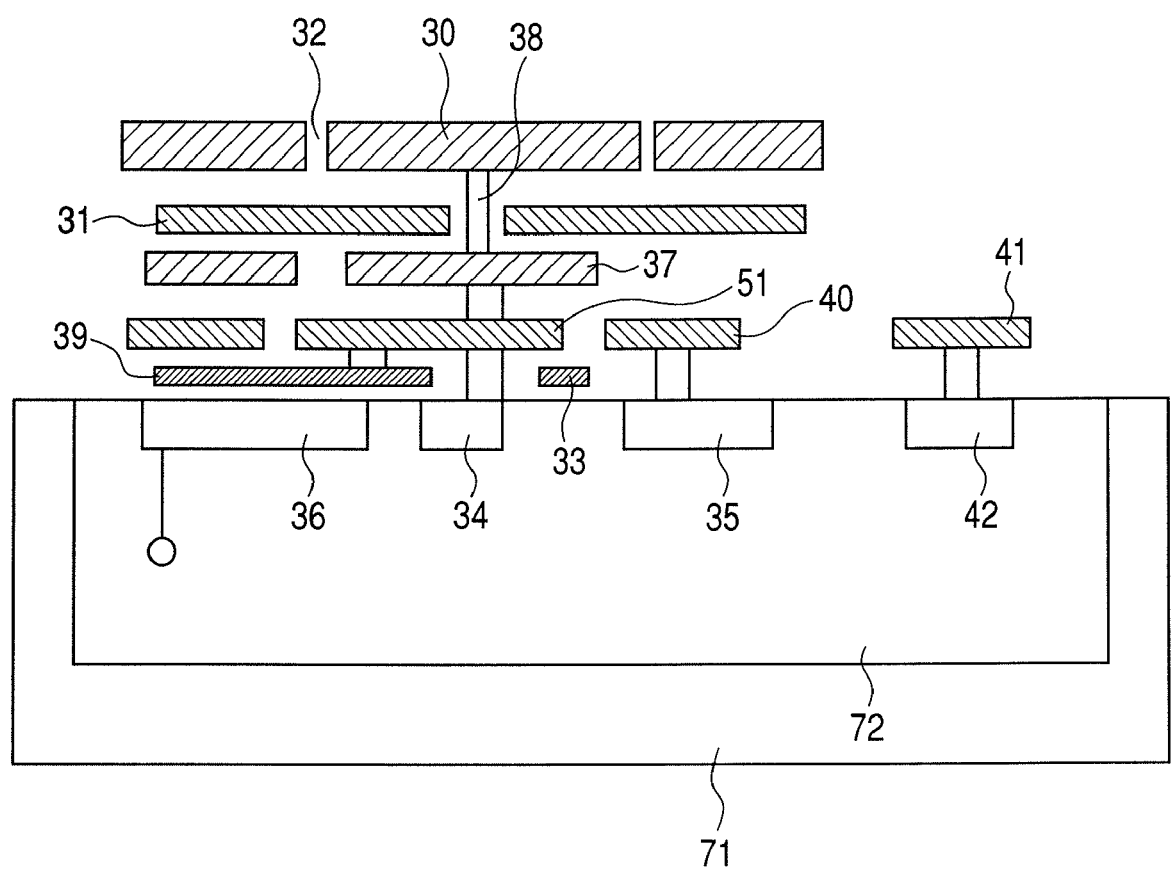
FIG. 11B is a cross-sectional view of the pixel part of a liquid crystal display apparatus in Embodiment 7 of the present invention.

FIGS. 11A and 11B are a plan view and a schematic cross-sectional view, respectively illustrating the pixel configuration of a reflection type liquid crystal display apparatus of this embodiment. FIG. 11A is a plan view of a pixel layout of this embodiment, and FIG. 11B is a cross-sectional view along a line 11B to 11B in FIG. 11A. In addition, in FIG. 11B, except for an insulating layer 32, insulating layers between respective layers are eliminated, for simplicity.

In FIGS. 11A and 11B, difference from FIGS. 2A and 2B describing Example 1, is in that, although, in FIGS. 2A and 2B, as the semiconductor substrate, the p type Si substrate was used, in FIGS. 11A and 11B of this embodiment, as the semiconductor substrate, an n type Si substrate 71 having a p-well 72 is used. The pixel region in the p-well 72 of the n type Si substrate 71 includes a drain region 34, source region 35, and a diffusion region 36.

In this embodiment, the voltage of the diffusion region 36 for forming a capacitor is set to a value higher than the reference value of the voltage applied to the drain region 34. For example, when the reference value is set to 7 V using a vertically oriented liquid crystal, a voltage of 7 V±5 V is applied to the drain region due to an alternating current drive. In this case, for example, the fixed voltage in the diffusion region 36 is set to 8 V. By setting in this manner, a configuration is obtained, where the electrons of the photo-carriers generated in a substrate are rapidly gathered in the diffusion region 36, and hardly gathered in the floating part of the drain region 34, thus enabling to suppress the degradation of the display properties.

The above example will be represented by general notations. When the unit electric charge of majority carriers is determined as Q, since, if the majority carriers are electrons, the unit electric charge $Q=-q$ (where $q=1.6 \times 10^{-19}$ C), the product of the unit electric charge in the drain region 34 and the reference value of the voltage becomes to $-7$ q. If the voltage of the diffusion region 36 is set to 8 V, the product of the unit electric charge and the voltage in the diffusion region 36 becomes to $-8$ q, which is smaller than the product of the unit electric charge and the reference value of the voltage in the drain region 34. In this manner, by causing the product of the unit electric charge and the voltage in the diffusion region 36 to be smaller than the product of the unit electric charge and the reference value of the voltage in the drain region 34, such a potential gradient where electrons flow into the drain region 34, is generated, thus resulting in that electrons that are photo carriers, are absorbed by the diffusion region 36.

In addition, in this embodiment description is done using the form where an n-MOS transistor is used as a p-well of an n type Si substrate, however, there is also no problem to use a form where a p-MOS transistor is used as an n-well of a p type Si substrate. In this case, since the photo carriers are holes, in order to cause the voltage of the diffusion region 36 to be lower than the reference value 7 V applied to the drain region 34, with respect to the holes that are the major carriers, for example the voltage applied to the diffusion region 36 is set to 6 V. At that time, since the majority carriers are holes, the unit electric charge becomes as Q=q, and the product of the unit electric charge and the reference value of the voltage in the drain region 34 is becomes to 7 Q. If the voltage of the diffusion region 36 is set to 6 V, the product of the unit electric charge and the voltage in the diffusion region 36 becomes to 6 q, which is smaller than the product of the unit electric charge and the reference value of the voltage in the drain region 34. In this manner, by causing the product of the unit electric charge and the voltage in the diffusion region 36 to be smaller than the product of the unit electric charge and the reference value of the voltage in the drain region 34, such a potential gradient where holes flow into the drain region 34, is generated, thus resulting in contribution in that holes that are photo carriers, are absorbed by the diffusion region 36.

Moreover, when an n-MOS transistor is used as a p-well of an n type Si substrate, in order to absorb photo carriers more strongly using the diffusion region 36, it is preferable to cause the voltage of the diffusion region 36 to be larger than 12 V that is the maximum voltage of the drain region in a drive period. This enables to cause the potential gradient to be sharp, thus more electrons easily flow into the diffusion region 36. In addition, in this embodiment, a case where an MOS transistor is used as the switch element of a pixel, is described, however, the configuration of the switch element is not limited in particular. That is because, the present invention addresses a problem in that, when the switch element to be connected to the pixel electrode is in an off state, if electric charges are collected in a semiconductor region to be one main electrode region of the switch element in a floating state, an adverse affect will be given to the display properties. Moreover, in this embodiment, although the diffusion region 36 constitutes one electrode of the capacitor, the diffusion region 36 may be provided separately from the diffusion region constituting one electrode of the capacitor.

Next, using FIGS. 11A and 11B, the manufacturing method of a reflection type liquid crystal display apparatus of the present invention will be described.

By means of a partial thermal oxidation of the n type Si substrate 71, a field oxide film such as a LOCOS (Local Oxidation of Silicon) oxide film is formed. Subsequently, using the LOCOS as a mask, by ion-implanting boron in the substrate at a doze of $10^{12}$ cm$^{-2}$ order, a p-well 72, that is a p-type impurity region, is formed. Then, by subjecting the substrate to thermal oxidation again, a gate oxide film with a thickness of 600 angstroms is formed. Subsequently, after patterning, by ion-implanting phosphorus in the substrate at a doze of $10^{15}$ cm$^{-2}$ order, the diffusion region 36 whose impurity concentration is $10^{18}$ cm$^{-3}$ order and an electrode 39 are formed. Subsequently, the gate electrode 33 and the electrode 39, made of n type polysilicon doped with phosphorus at an order of $10^{20}$ cm$^{-3}$, are formed. Then, by ion-implanting phosphorus in the substrate at a doze of $10^{12}$ cm$^{-2}$ order, an n-type low concentration drain is formed, which is an n-type impurity semiconductor region with an impurity concentration of $10^{16}$ cm$^{-3}$ order. By depositing an oxide film on the substrate by means of a CVD process, and, by means of an etching back process, the oxide film is removed except for the side walls of the polysilicon electrode 39 and polysilicon gate electrode 33. After that, using a patterned photoresist as a mask, by ion-implanting phosphorus in the substrate at a doze of $10^{15}$ cm$^{-2}$ order, the source region 35 and the drain region 34, whose impurity concentration is $10^{19}$ cm$^{-3}$ order, are formed, and, thereby, an n-MOS transistor is formed. Similarly, a p-MOS transistor is formed.

After that, an interlayer insulation film is formed on the entire surface of the substrate. As the interlayer insulation film, an insulation film such as PSG (Phospho-silicate Glass) and NSG (Non-dope Silicate Glass)/BPSG (Boro-Phospho-Silicate Glass), or TEOS (Tetraetoxy-silane), is applicable. By patterning a contact hole directly above the source region 35 and the drain region 34, by evaporating Al thereon by means of sputtering, and subsequently by patterning the evaporated Al, first metal conductive layers such as the signal line 40, the electrode 41, and the underlying layer 51, are formed. In order to improve the ohmic contact property between the first metal conductive layer and the source region or the drain region, it is desirable to form a barrier metal such as a lamination film of Ti and TiN between the first metal conductive layer and the source region 35 or the drain region 34. After that, an interlayer insulating film and a second metal conductive film such as the underlying wire 37 are laminated and formed, subsequently, a metal film that is the light shielding film 31, is formed. The metal film is, for example, a metal such as Ti, TiN, or Al, or a lamination film thereof, and is not limited in particular. Using the layer, main lights are shielded. After patterning the film and subsequently an interlayer insulating film is formed further, a plug is opened. Subsequently, after depositing W in the plug, the surface is flattened by means of a CMP process. After that, by means of a sputtering process, a reflection electrode layer is deposited on the surface at a thickness of about 200 nm, and by patterning the surface, the reflection electrode 30 is formed. After that, by means of a plasma enhanced CVD process, a silicon oxide film as the protective film 32 is formed on the surface at a thickness of 100 nm. Furthermore, using an oblique vapor deposition apparatus, as the obliquely vapor deposition (alignment) film 44, a silicon oxide film for orienting the liquid crystal is formed on the surface at a thickness of about 100 nm.

Similarly, on the light transmitting electrode 47 of the glass substrate 46, using the oblique vapor deposition apparatus, a silicon oxide film was also formed as the obliquely vapor deposition (alignment) film 43, at a thickness of about 100 nm, and subsequently the p-type substrate 70 and the glass substrate 46 were laminated. By inserting a vertically oriented liquid crystal between the laminated substrates, and taking electrodes by means of wire bonding, a reflection type liquid crystal display apparatus was produced. When being produced using three of the reflection type liquid crystal display apparatuses, a liquid crystal projector system with high brightness and high reliability could be obtained.

Embodiment 8

Now, Embodiment 8 of the present invention will be described in detail based on FIGS. 12A and 12B.

Figure 12A:
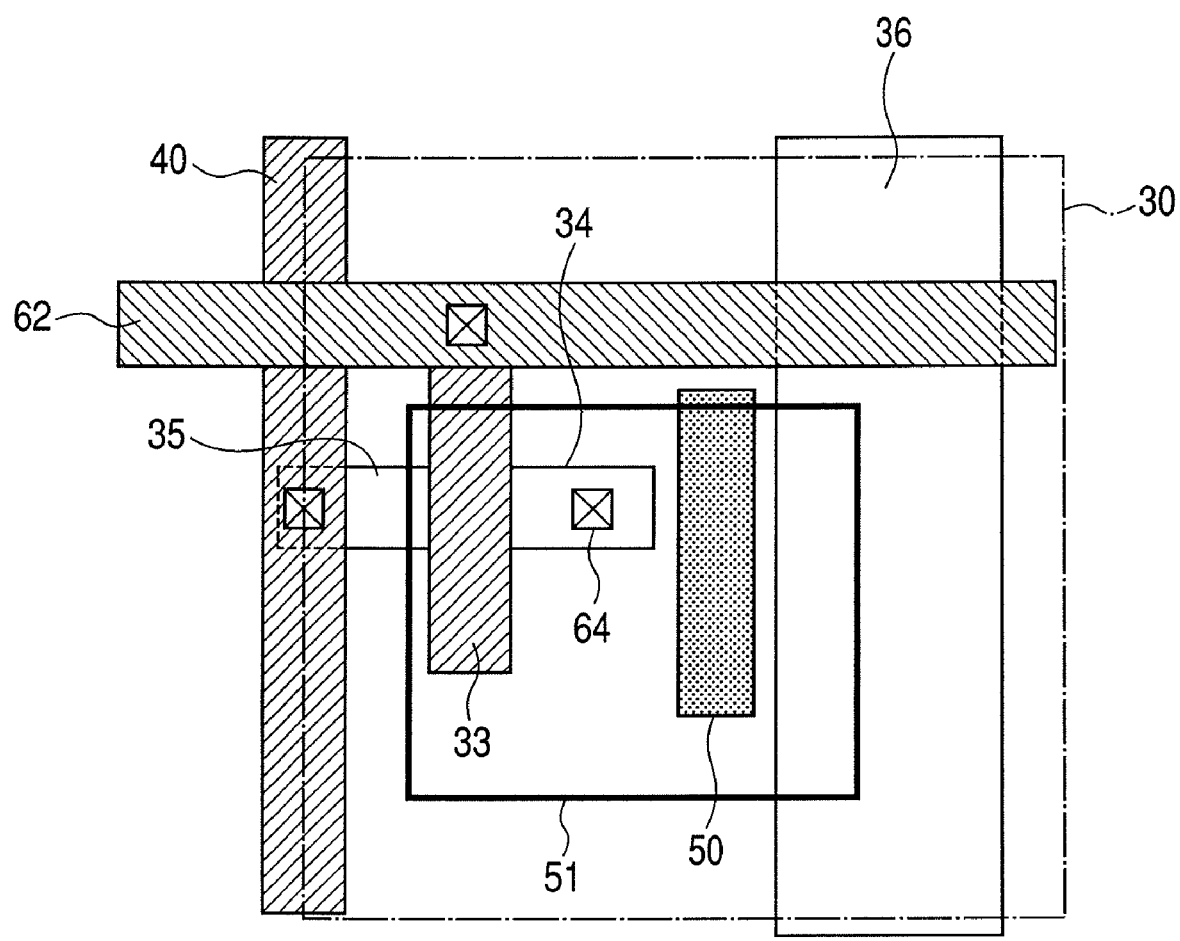
FIG. 12A is a plan view of the pixel part of a liquid crystal display apparatus in Embodiment 8 of the present invention.
Figure 12B:
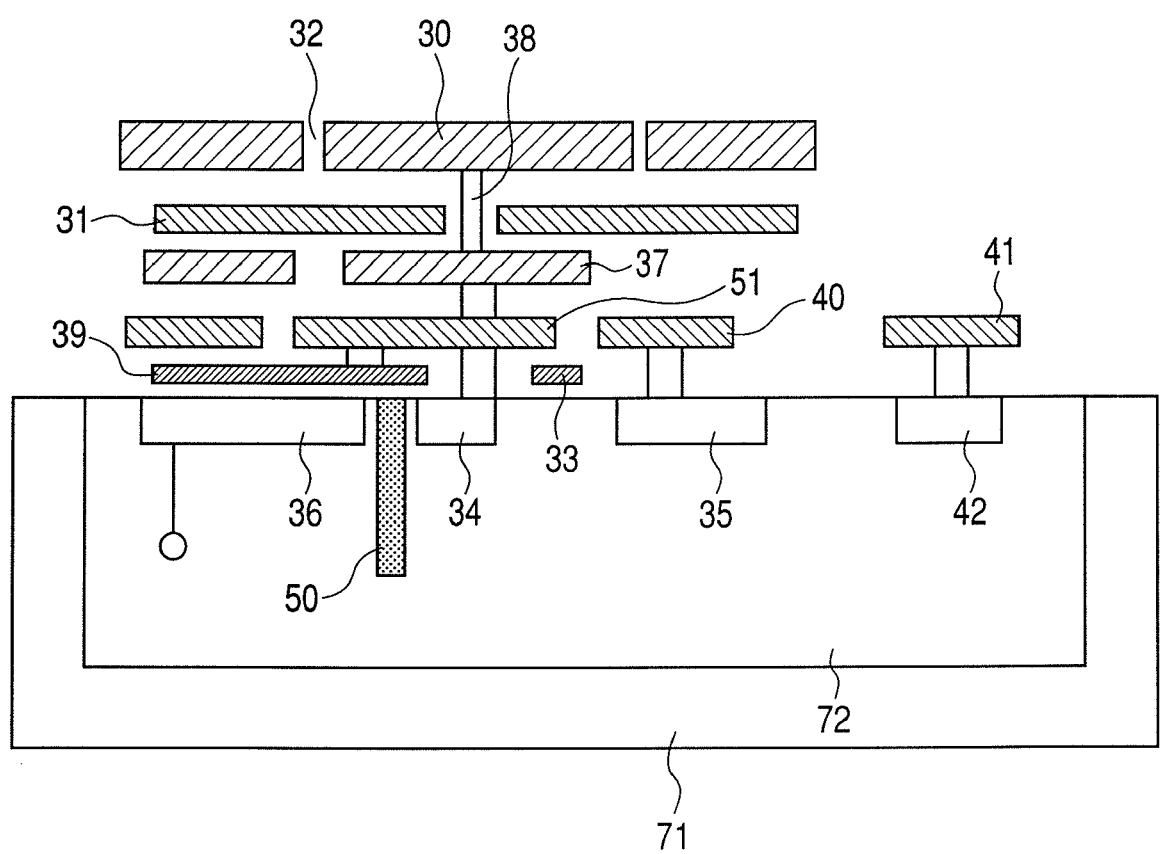
FIG. 12B is a cross-sectional view of the pixel part of a liquid crystal display apparatus in Embodiment 8 of the present invention.

In FIGS. 12A and 12B, a pixel part used for a reflection type liquid crystal display apparatus according to Embodiment 3 of the present invention. FIG. 12A is a plan view of the pixel part, and FIG. 12B is a cross-sectional view of the pixel part. Here, similar components as those in Examples 3 and 7, are denoted by the same reference numerals as those in Examples 3 and 7, and detailed description thereof will be eliminated.

In Embodiment 8, in addition to the components in Embodiment 7, a p-type region 50 is formed between a drain region 34 and a diffusion region 36. The p-type region 50 has a function of a potential barrier so that electrons, photo carriers produced inside a p-well 72, hardly reach to the drain region 34. As shown in FIG. 12B, the p-type region 50 preferably locates from the surface to the deep inside of the p-well 72. However, the present invention is not limited to this, in particular, and even if the p type region 50 locates only on the surface or only at the deep inside of the p-well 72, the barrier effect is still present, for example, by means of ion implantation, by implanting ions in multiple steps, the barrier layer may be formed. Moreover, in Embodiment 8, as the case in Embodiment 7, a diffusion region 36 has a function of the suction port of electrons. In Embodiment 8, by forming the drain region 34 in a size smaller than the size of the drain region 34 in Embodiment 7, and by shielding the drain region 34 from a light using an underlying layer 51 formed above the drain region 34, light incidence from the side immediately above the drain region 34 is suppressed. The photo carriers generated by a light entered outside the drain region 34, are suppressed from diffusing in the drain region 34 by the p type region 50 which acts as a potential barrier. Therefore, degradation of the display properties due to the light incidence is suppressed further. In this embodiment, the voltage of the diffusion region 36 is adjusted as in Embodiment 7. However, in this embodiment, the diffusion region 36 may not be provided, and even if only the p type region 50 which acts as a potential barrier, is provided, the diffusion of the photo carriers into the drain region 34 can be suppressed. In other words, in FIG. 12B, although the region of the pixel in the p-well 72 includes the drain region 34, the source region 35, the diffusion region 36, and the p type region 50; a region including the drain region 34, the source region 35, and the p type region 50, may be used as the pixel region. However, for the pixel including the diffusion region 36, whose voltage is adjusted, similar to the pixel in Embodiment 7, the diffusion of the photo carriers to the drain region 34 can be suppressed further than the pixel without the diffusion region 36.

Now, a manufacturing method of the reflection type liquid crystal display apparatus of this embodiment will be described. The fundamental steps are the same as those in Embodiment 7. The p type region 50 can be formed, for example, by forming a gate oxide film, patterning the film, and subsequently subjecting the film to ion-implantation of boron under the following three conditions of accelerating voltage: 30 KeV, 70 KeV and 140 KeV, so that the impurity concentration of the film becomes to an order of $5 \times 10^{17}$ cm$^{-3}$. Subsequently, after patterning the film, by subjecting the film to ion-implantation of phosphorous at a doze amount of $10^{15}$ cm$^{-2}$ order, the diffusion region 36 whose impurity concentration is an order of $10^{18}$ cm$^{-3}$, is formed. The other steps are the same as those of in Example 7. In addition, in this embodiment, an example of an n type Si substrate having a p-well is described, and an n-MOS transistor is used as a pixel switch, however, there is also no problem to use a p type Si substrate having an n-well and use a p-MOS transistor as the pixel switch. At that time, since the photo carriers are holes, the region 50 to be a potential barrier layer is an n type region.

After that, also on a light transmitting electrode of a glass substrate 46, using an oblique vapor deposition apparatus, similarly, a silicon oxide film was formed at a thickness of about 100 nm, as an obliquely vapor deposition (alignment) film 43; and subsequently, the n type Si substrate 71 and the glass substrate 46 were laminated. By injecting a vertically oriented liquid crystal between the laminated substrates, and by taking out electrodes by means of wire bonding, the reflection type liquid crystal display apparatus was produced. When being produced using three of the reflection type liquid crystal display apparatuses, a liquid crystal projector system with high brightness and high reliability could be obtained.

Embodiment 9

Now, based on FIG. 13, Embodiment 9 of the present invention will be described in detail.

Figure 13:
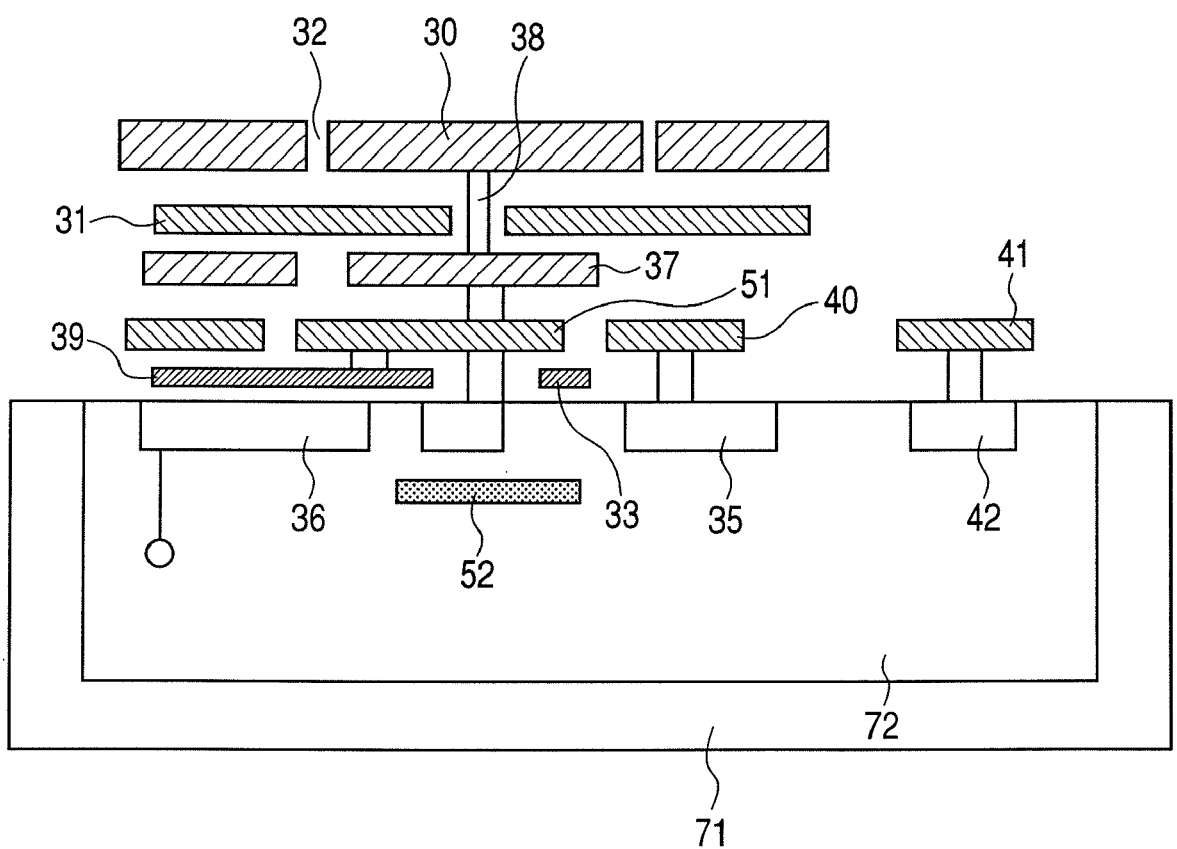
FIG. 13 is a cross-sectional view of the pixel part of a liquid crystal display apparatus in Embodiment 9 of the present invention.

FIG. 13 is a cross-sectional view of a pixel part used for a reflection type liquid crystal display apparatus of Embodiment 9 of the present invention. In this embodiment, a p type region 52 having a function of a potential barrier is formed at a part below a drain region 34. In this embodiment, as in the cases of Embodiments 7 and 8, as the suction port of electrons, a diffusion region 36 is also provided. In Embodiment 9, as in the case of Embodiment 3, by forming a drain region 34 in a size smaller than the size of the drain region 34 in Embodiment 7, and by shielding the drain region 34 from a light using an underlying layer 51 formed above the drain region 34, light incidence from the side immediately above the drain region 34 is also suppressed. The photo carriers generated by a light which entered deeply in the region below the drain region 34 by means of oblique incidence or scattering, can be suppressed from diffusing in the drain region 34 by the p type region 52 which acts as a potential barrier. Therefore, degradation of the display properties due to the light incidence is suppressed largely. Although, it is preferable for the depth of the p type region 52 to be near to the drain and to be shallow so as to improve the photo carrier suppression properties and to increase a capacitor, the depth is arbitrarily set in consideration of designing items such as a problem of a withstanding voltage.

Figure 14:
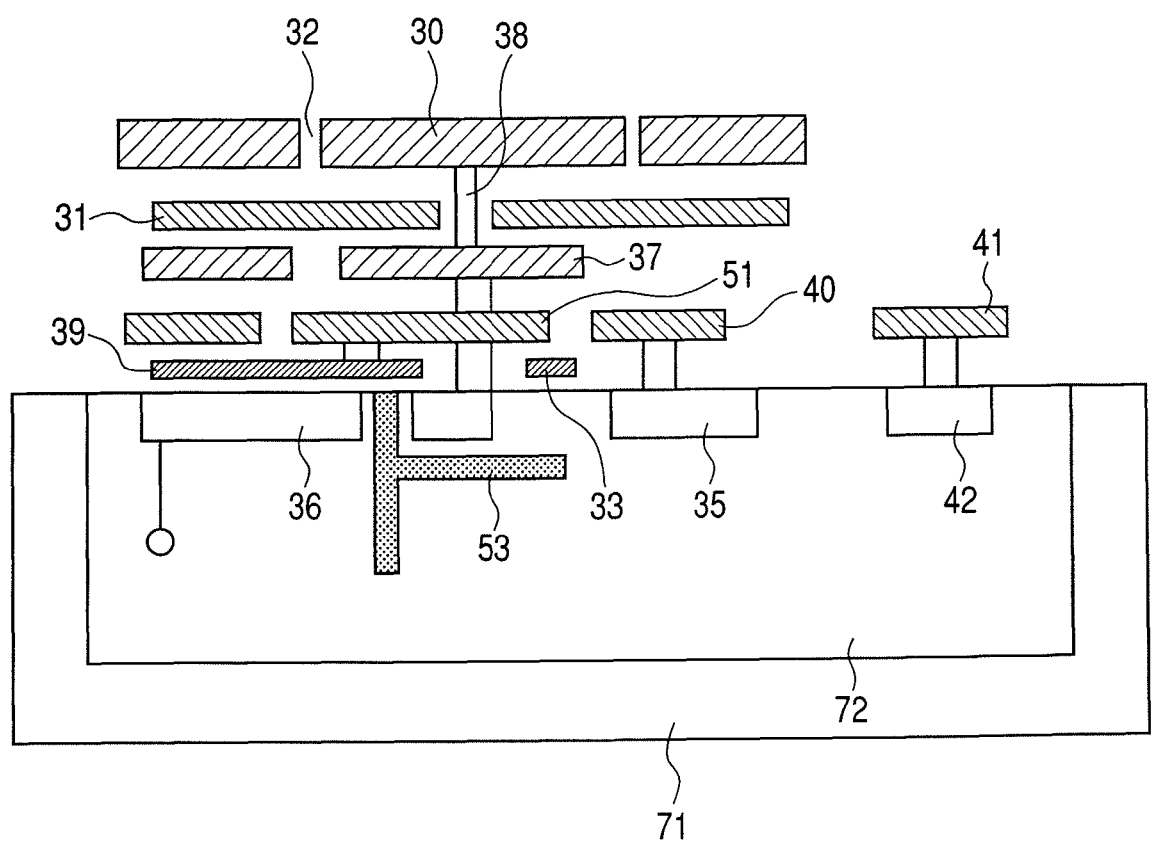
FIG. 14 is another cross-sectional view of the pixel part of a liquid crystal display apparatus in Embodiment 9 of the present invention.

Moreover, in this embodiment, the voltage of the diffusion region 36 is adjusted as the case in Embodiment 7. However, in this embodiment, the diffusion region 36 may not be provided, and even if only the p type region 52 is provided, the diffusion of the photo carriers into the drain region 34 can be suppressed. In other words, in FIG. 13, although the region of the pixel in a p-well 72 of an n type Si substrate includes the drain region 34, the source region 35, the diffusion region 36, and the p type region 52; a region including the drain region 34, the source region 35, and the p type region 52, may be used as the pixel region. However, for the pixel including the diffusion region 36, whose voltage is adjusted, similar to the pixel in Embodiment 7, the diffusion of the photo carriers to the drain region 34 can be suppressed further than the pixel without the diffusion region 36. Moreover, as illustrated in FIG. 14, when a p type region 53 is formed by combining the p type region 50 in Embodiment 8, although the number of steps in a process increases, in view of suppressing photo carriers, it is of course preferable. When being produced using three of the reflection type liquid crystal display apparatuses, a liquid crystal projector system with high brightness and high reliability could be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2006-114432, filed Apr. 18, 2006, and No. 2006-114433, filed Apr. 18, 2006, and No. 2007-106671, filed Apr. 16, 2007, which are hereby incorporated by reference herein in their entirety.

What is claimed is:

1. A reflection type liquid crystal display apparatus comprising:
   a light transmitting substrate having a light transmitting electrode; and
   a first conduction type semiconductor substrate arranged in opposition to the light transmitting substrate sandwiching a liquid crystal between the light transmitting substrate and the first conduction type semiconductor substrate, and having a plurality of pixel electrodes arranged in a matrix, wherein the first conduction type semiconductor substrate has a pixel including a first semiconductor region which has a second conduction type being opposite to the first conduction type and acts as a main electrode region of a switch element electrically connected to the pixel electrodes, and a second semiconductor region which has the second conduction type and is provided separately from the switch element, and wherein the first semiconductor region is configured such that a voltage for an alternating current drive which has a reference value between a maximum voltage and a minimum voltage is applied to the first semiconductor region, a majority carrier of the second conduction type is an electron, and the second semiconductor region is configured such that a voltage higher than the reference value is applied to the second semiconductor region.

2. A reflection type liquid crystal display apparatus comprising:
a light transmitting substrate having a light transmitting electrode; and
a first conduction type semiconductor substrate arranged in opposition to the light transmitting substrate sandwiching a liquid crystal between the light transmitting substrate and the first conduction type semiconductor substrate, and having a plurality of pixel electrodes arranged in a matrix,
wherein the first conduction type semiconductor substrate has a pixel including a first semiconductor region which has a second conduction type being opposite to the first conduction type and acts as a main electrode region of a switch element electrically connected to the pixel electrodes, and a second semiconductor region which has the second conduction type and is provided separately from the switch element, and
wherein the first semiconductor region is configured such that a voltage for an alternating current drive which has a reference value between a maximum voltage and a minimum voltage is applied to the first semiconductor region, a majority carrier of the second conduction type is a hole, and the second semiconductor region is configured such that a voltage lower than the reference value is applied to the second semiconductor region.

3. A reflection type liquid crystal display apparatus comprising:
a light transmitting substrate having a light transmitting electrode; and
a second conduction type semiconductor substrate arranged in opposition to the light transmitting substrate sandwiching a liquid crystal between the light transmitting substrate and the second conduction type semiconductor substrate, and having a well where a plurality of pixel electrodes are arranged in a matrix and which has a first conduction type being opposite to the second conduction type,
wherein the second conduction type semiconductor substrate has a pixel in the well, including a first semiconductor region which has the second conduction type being opposite to the first conduction type and acts as a main electrode region of a switch element electrically connected to the pixel electrodes and a second semiconductor region which has the second conduction type and is provided separately from the switch element, and
wherein the first semiconductor region is configured such that a voltage for an alternating current drive which has a reference value between a maximum voltage and a minimum voltage is applied to the first semiconductor region, a majority carrier of the second conduction type is an electron , and the second semiconductor region is configured such that a voltage higher than the reference value is applied to the second semiconductor region.

4. A reflection type liquid crystal display apparatus comprising:
a light transmitting substrate having a light transmitting electrode; and
a second conduction type semiconductor substrate arranged in opposition to the light transmitting substrate sandwiching a liquid crystal between the light transmitting substrate and the second conduction type semiconductor substrate, and having a well where a plurality of pixel electrodes are arranged in a matrix and which has the a first conduction type being opposite to the second conduction type,
wherein the second conduction type semiconductor substrate has a pixel in the well, including a first semiconductor region which has the second conduction type being opposite to the first conduction type and acts as a main electrode region of a switch element electrically connected to the pixel electrodes, and a second semiconductor region which has the second conduction type and is provided separately from the switch element, and
wherein the first semiconductor region is configured such that a voltage for an alternating current drive which has a reference value between a maximum voltage and a minimum voltage is applied to the first semiconductor region, a majority carrier of the second conduction type is a hole, and the second semiconductor region is configured such that a voltage lower than a reference value is applied to the second semiconductor region.

5. A reflection type liquid crystal display apparatus comprising:
a light transmitting substrate having a light transmitting electrode; and
a first conduction type semiconductor substrate arranged in opposition to the light transmitting substrate sandwiching a liquid crystal between the light transmitting substrate and the first conduction type semiconductor substrate, and having a plurality of pixel electrodes arranged in a matrix,
wherein the first conduction type semiconductor substrate includes a first semiconductor region which acts as a main electrode region of a switch element electrically connected to the pixel electrodes and has a second conduction type being opposite to the first conduction type, and a second semiconductor region which is provided at a part of the periphery of the first semiconductor region separately from the switch element and has the first conduction type and acts as a potential barrier.

6. The reflection type liquid crystal display apparatus according to claim 5, wherein the at least the part of the periphery the first semiconductor region includes a part of the surroundings of the first semiconductor region viewed from the side on the substrate plane of the semiconductor substrate, and/or at least a part of a region below the first semiconductor region.

7. The reflection type liquid crystal display apparatus according to claim 5, wherein, when the unit electric charge of a second conduction type majority carrier is determined as Q, with regard to the second conduction type majority carrier, a third semiconductor region having the product of its voltage and the Q smaller than the product of the voltage and the Q in the first semiconductor region and the second conduction type, is included, and the second semiconductor region is present at least between the first semiconductor region and the third semiconductor region.

8. A reflection type liquid crystal display apparatus comprising:
- a light transmitting substrate having a light transmitting electrode; and
- a second conduction type semiconductor substrate arranged in opposition to the light transmitting substrate sandwiching a liquid crystal between the light transmitting substrate and the second conduction type semiconductor substrate, and having a well where a plurality of pixel electrodes are arranged in a matrix and which has a first conduction type being opposite to the second conduction type,
- wherein the well includes a first semiconductor region which acts as a main electrode region of a switch element electrically connected to the pixel electrodes and has a second conduction type being opposite to the first conduction type, and a second semiconductor region which is provided at a part of the periphery of the first semiconductor region separately from the switch element and has the first conduction type and acts as a potential barrier.

9. The reflection type liquid crystal display apparatus according to claim 8, wherein the at least the part of the periphery the first semiconductor region includes a part of the surroundings of the first semiconductor region viewed from the side on the substrate plane of the semiconductor substrate, and/or at least a part of a region below the first semiconductor region.

10. The reflection type liquid crystal display apparatus according to claim 8, wherein,
- when the unit electric charge of a second conduction type majority carrier is determined as Q, with regard to the second conduction type majority carrier, a third semiconductor region having the product of its voltage and the Q smaller than the product of the voltage and the Q in the first semiconductor region and the second conduction type, is included, and the second semiconductor region is present at least between the first semiconductor region and the third semiconductor region.

11. A liquid crystal projector system comprising:
a reflective liquid crystal display apparatus according to claim 1.

12. A liquid crystal projector system comprising:
a reflective liquid crystal display apparatus according to claim 2.

13. A liquid crystal projector system comprising:
a reflective liquid crystal display apparatus according to claim 2.

14. A liquid crystal projector system comprising:
a reflective liquid crystal display apparatus according to claim 4.

15. A liquid crystal projector system comprising:
a reflective liquid crystal display apparatus according to claim 5.

16. A liquid crystal projector system comprising:
a reflective liquid crystal display apparatus according to claim 8.

* * * * *